(12) United States Patent
Wu et al.

(10) Patent No.: US 7,216,295 B2
(45) Date of Patent: May 8, 2007

(54) METHOD OF AUTOMATIC PRODUCTION OF IMAGE PRESENTATIONS

(75) Inventors: Jing Wu, Carlingford (AU); Julie Rae Kowald, Dundas Valley (AU); Alison Joan Lennon, Balmain (AU); Daniel John Lloyd-Jones, Kambah (AU)

(73) Assignee: Canon Kabushiki Kaisha, Tokyo (JP)

( * ) Notice: Subject to any disclaimer, the term of this patent is extended or adjusted under 35 U.S.C. 154(b) by 568 days.

(21) Appl. No.: 10/323,938

(22) Filed: Dec. 20, 2002

(65) Prior Publication Data
US 2003/0147465 A1 Aug. 7, 2003

(30) Foreign Application Priority Data
Dec. 20, 2001 (AU) ................................. PR9663
Dec. 20, 2001 (AU) ................................. PR9664

(51) Int. Cl.
*G06F 15/00* (2006.01)
*G09G 5/00* (2006.01)

(52) U.S. Cl. .................. 715/517; 715/730; 345/619

(58) Field of Classification Search ........ 715/730–732, 715/838, 517; 382/305, 306; 345/660–671, 345/619
See application file for complete search history.

(56) References Cited

U.S. PATENT DOCUMENTS

| | | | | |
|---|---|---|---|---|
| 5,640,522 A * | 6/1997 | Warrin | ................ | 715/732 |
| 5,675,752 A | 10/1997 | Scott et al. | ................ | 395/333 |
| 6,012,069 A * | 1/2000 | Shibazaki | ................ | 707/104.1 |
| 6,058,143 A * | 5/2000 | Golin | ................ | 375/240.16 |
| 6,148,274 A * | 11/2000 | Watanabe et al. | ................ | 703/6 |
| 6,292,251 B1 * | 9/2001 | Holley et al. | ................ | 355/32 |
| 6,640,009 B2 * | 10/2003 | Zlotnick | ................ | 382/224 |
| 6,658,168 B1 * | 12/2003 | Kim | ................ | 382/305 |
| 6,819,795 B1 * | 11/2004 | Chiu et al. | ................ | 382/173 |

FOREIGN PATENT DOCUMENTS

| | | |
|---|---|---|
| AU | 200071986 A1 | 6/2001 |
| AU | 200071986 B2 | 6/2001 |
| WO | 00/62190 | 10/2000 |
| WO | 00/73914 A1 | 12/2000 |

OTHER PUBLICATIONS

J.E. Van Der Hyden, et al., "Visual Presentation of Magnetic Resonance Images," Oct. 18-23, 1998, pp. 423 through 426.

\* cited by examiner

*Primary Examiner*—Kee M. Tung
*Assistant Examiner*—Michelle K. Lay
(74) *Attorney, Agent, or Firm*—Fitzpatrick, Cella, Harper & Scinto

(57) ABSTRACT

A method (100) is disclosed for producing, using a multi-slot presentation skeleton (400), an image presentation from a set of source images (702). The method comprises establishing a duration of the presentation, an average slot duration, and based upon slot template rules, locations and properties of key slots in the skeleton (400). The method then generates (104) candidate groups of sub-image sets from the set of source images, and selects (106) sub-image sets from the candidate groups for the key slots. The method then fills (108) the non-key slots with sub-image sets from the candidate groups, and processes (110) the sub-image sets in the skeleton slots using effect and transition rules, to thereby form the image presentation.

44 Claims, 18 Drawing Sheets

A

B  C

D

E

F

METHOD OF AUTOMATIC PRODUCTION OF IMAGE PRESENTATIONS

COPYRIGHT NOTICE

This patent specification contains material that is subject to copyright protection. The copyright owner has no objection to the reproduction of this patent specification or related materials from associated patent office files for the purposes of review, but otherwise reserves all copyright whatsoever.

TECHNICAL FIELD OF THE INVENTION

The present invention relates generally to image processing and, in particular, to image post-processing by inexperienced users. The invention relates to a method and apparatus for automatic and semi-automatic compilation of images for presentation.

The invention also relates to automatic selection and ordering of still images, video clips and audio clips (these being referred to as "media items") for presentation purposes, and, in particular, to use of a genetic optimisation process in that regard.

BACKGROUND ART

Digital cameras, video camcorders, and a wide variety of other consumer devices for image capture and storage are widely available to today's consumers. Consumers who are active in the field of image capture generally accumulate growing archives of images, storing these images either on hard drives in their personal computers (PCs) or on other electronic databases which may be accessible over local or wide area networks (LANs, WANs). Consumers, hereinafter referred to as "editors", may often wish to build a series of these stored images into a presentation, either for entertainment or more particularly to deliver a particular visual message. Video effects and transitions can be used to enhance the visual impact of such presentations, however first and foremost, the selection and ordering of the images in the presentation must be done in a manner consistent with the goals of the editor.

Stored images may be related to each other in some fashion, for example, by having been captured sequentially in the course of a particular event such as a birthday party. In this event, the time-sequential relationship between the images can often be used as a basis for selecting and ordering the images in the presentation. If, on the other hand, no such inter-image relationship exists, then effective selection and ordering of images can require technical and artistic skills beyond the reach of the typical editor.

A significant amount of value can be added to raw source image material by performing effective post-processing, and ensuring appropriate arrangement of the post-processed images. Sequential image presentations are capable of delivering a wide variety of visual messages, and these can be enhanced by incorporation of video effects and inter-image transitions to increase the visual impact of the presentation.

The presentation of visual images to an audience is an important component of many industries and activities. Accordingly, significant demands are placed upon an "editor" (being a person performing an editing function) of the raw source material, requiring him or her to employ techniques other than mere sequencing of images along a time-line. In order to ensure an effective outcome, it is necessary to select and arrange, in the final production, different types of image from a source image set, and to effectively use video effects and image sequencing techniques.

Professionals who produce image presentations make use of techniques and approaches that are typically complex, and that require a deal of technical, and artistic expertise and experience. This poses a problem for ordinary users of image capture devices and Personal Computers (PCs) who might wish, as editors, to compose image presentations that are pleasing to an audience. Such editors generally do not have the requisite experience and expertise of the professionals in the field, and it is extremely difficult for them to compile effective presentations from the raw source images. The availability of computer-aided image and video editing software provides some assistance to such editors, however significant investment of time and effort is required to use even these tools effectively.

SUMMARY OF THE INVENTION

It is an object of the present invention to substantially overcome, or at least ameliorate, one or more disadvantages of existing arrangements.

According to a first aspect of the invention, there is provided a method of producing, using a multi-slot presentation skeleton, an image presentation from a set of source images, the method comprising the steps of:

establishing locations of key slots and non-key slots in the skeleton;

generating candidate groups of sub-image sets from the set of source images;

inserting, into each said key slot, one sub-image set from the candidate groups;

placing, into each said non-key slot, one sub-image set from the candidate groups; and processing the sub-image sets in the skeleton slots using effect and transition rules, to thereby form the image presentation.

According to another aspect of the invention, there is provided a method of producing an image presentation from a set of source images, the method comprising the steps of:

(a) applying at least one of cropping and sizing to each source image to thereby derive at least one sub-image set for said each source image, each said sub-image set having a start sub-image and an end sub-image;

(b) assigning at least some of the derived sub-image sets to the presentation by determining, according to a fitness function, for candidate adjacent pairs of sub-image sets, the fitness of a match between the end sub-image and start sub-image at the boundary of the candidate adjacent pairs; and (c) applying at least one of zoom, pan and tilt effects to the sub-image sets assigned to the image presentation.

According to another aspect of the invention, there is provided an apparatus for producing an image presentation according to the aforementioned method.

According to another aspect of the invention, there is provided a computer program configured to direct a computer to produce an image presentation according to the aforementioned method.

According to another aspect of the invention, there is provided a method of composing an image presentation from a set of source images, the method comprising the steps of:

(i) building a population of candidate presentations each comprising a sequence of sub-image sets derived from the set of source images;

(ii) determining a presentation fitness of each said candidate presentation in the population according to a presentation fitness function;

(iii) if a stop condition is met, identifying the fittest candidate presentation from the population, as determined in accordance with the presentation fitness function, to thereby identify the image presentation; and (iv) if the stop condition is not met, (a) applying a genetic optimisation process to the population to thereby build a new population of candidate presentations, and (b) repeating steps (ii) and (iv) in respect of the new population.

According to another aspect of the invention, there is provided an apparatus for composing an image presentation from a set of source images, the apparatus comprising:

(i) means for building a population of candidate presentations each comprising a sequence of sub-image sets derived from the set of source images;

(ii) means for determining a presentation fitness for each said candidate presentation in the population according to a presentation fitness function;

(iii) means for identifying, if a stop condition is met, the fittest candidate presentation from the population, according to the presentation fitness function, to thereby identify the image presentation; and (iv) means, if the stop condition is not met, (a) for applying a genetic optimisation process to the population to thereby build a new population of candidate presentations, and (b) for repeating steps (ii) and (iv) in respect of the new population.

According to another aspect of the invention, there is provided a computer program product including a computer readable medium having recorded thereon a computer program to instruct a computer to implement a method of composing an image presentation, said program comprising:

(i) code for building a population of candidate presentations each comprising a sequence of sub-image sets derived from the set of source images;

(ii) code for determining a presentation fitness for each said candidate presentation in the population according to a presentation fitness function;

(iii) code for identifying, if a stop condition is met, the fittest candidate presentation from the population, according to the presentation fitness function, to thereby identify the image presentation; and (iv) code, if the stop condition is not met, (a) for applying a genetic optimisation process to the population to thereby build a new population of candidate presentations, and (b) for repeating steps (ii) and (iv) in respect of the new population.

According to another aspect of the invention, there is provided a computer program for instructing a computer to implement a method of composing an image presentation, said program comprising:

(i) code for building a population of candidate presentations each comprising a sequence of sub-image sets derived from the set of source images;

(ii) code for determining a presentation fitness for each said candidate presentation in the population according to a presentation fitness function;

(iii) code for identifying, if a stop condition is met, the fittest candidate presentation from the population, according to the presentation fitness function, to thereby identify the image presentation; and (iv) code, if the stop condition is not met, (a) for applying a genetic optimisation process to the population to thereby build a new population of candidate presentations, and (b) for repeating steps (ii) and (iv) in respect of the new population.

Other aspects of the invention are also disclosed.

BRIEF DESCRIPTION OF THE DRAWINGS

A number of embodiments of the present invention will now be described with reference to the drawings, in which.

DETAILED DESCRIPTION INCLUDING BEST MODE

Figure 1:
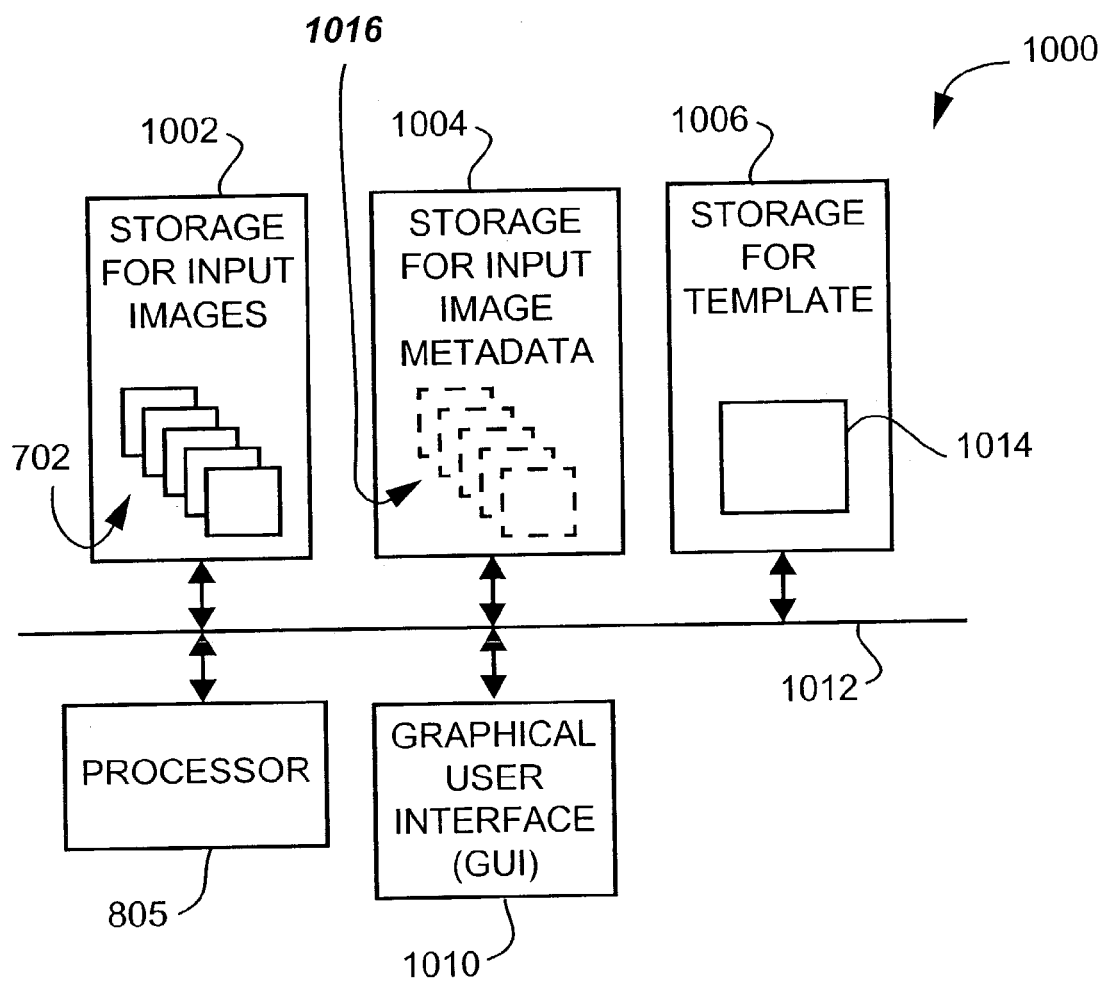
FIG. 1 shows a functional block diagram of a system for automatically producing image presentations.

Where reference is made in any one or more of the accompanying drawings to steps and/or features, that have the same reference numerals, those steps and/or features have for the purposes of this description the same function(s) or operation(s), unless the contrary intention appears.

FIG. 1 shows a functional block diagram of a system 1000 for automatically producing image presentations. The system 1000 has respective storage facilities 1002–1006 for storing input images, metadata associated with the input images, and one or more templates. The system 1000 also has a processor 805 and a Graphical User Interface (GUI) 1010. The system elements communicate over a communication bus 1012. The editor wishing to compose an image presentation can control the system 1000, by judicious use of the GUI 1010, to thereby produce and display a desired image presentation on the GUI.

An exemplary template 1014 is stored in the template store 1006. A set of source images 702 is stored in the image store 1002, and a set of associated metadata files is stored in the metadata store 1004. The template store 1006, image store 1002, and the metadata store 1004 can be implemented as part of either a remote database 822, or a hard disk drive 810 as will be described in relation to FIG. 3.

Figure 5:
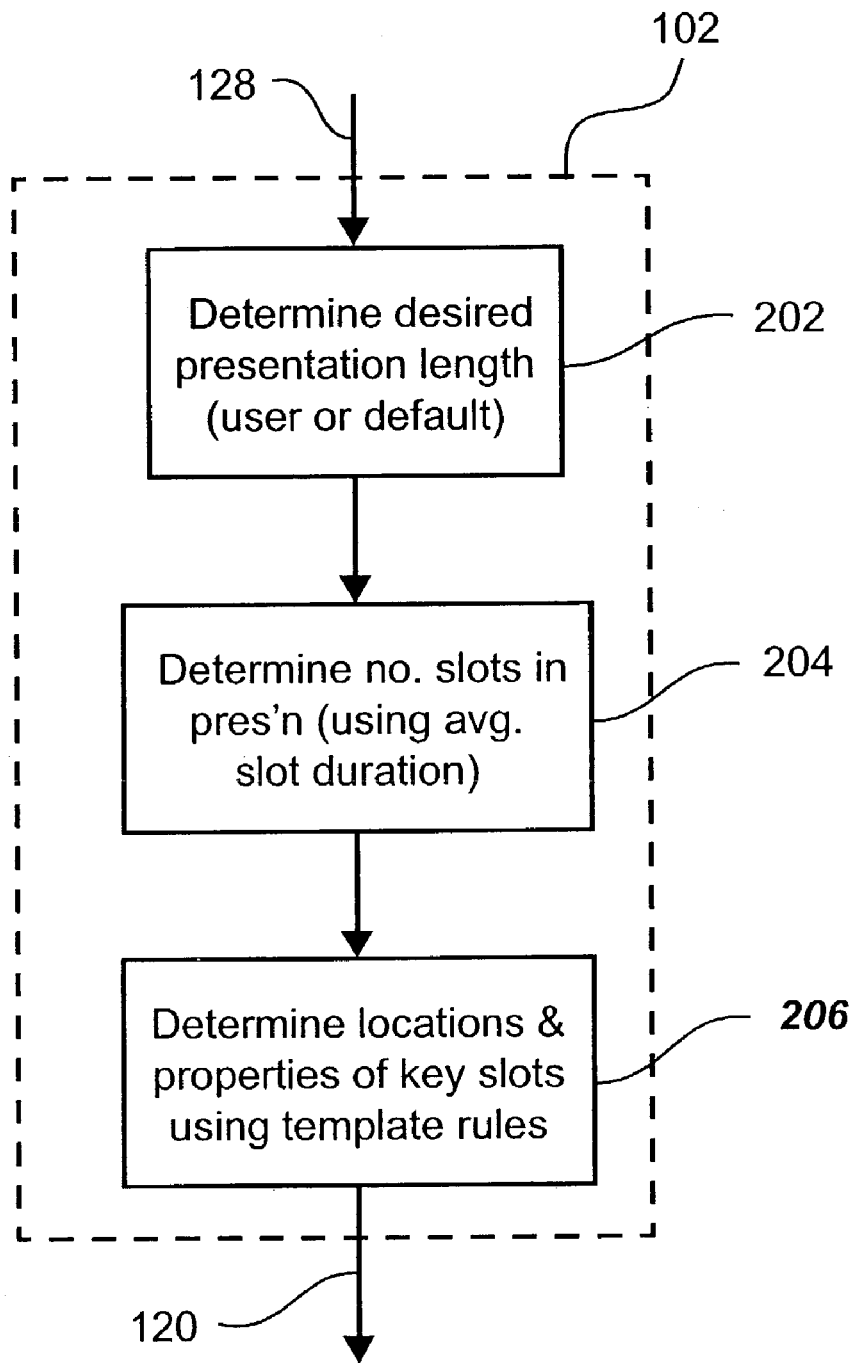
FIG. 5 shows a flow-chart for defining a presentation skeleton.
Figure 6:
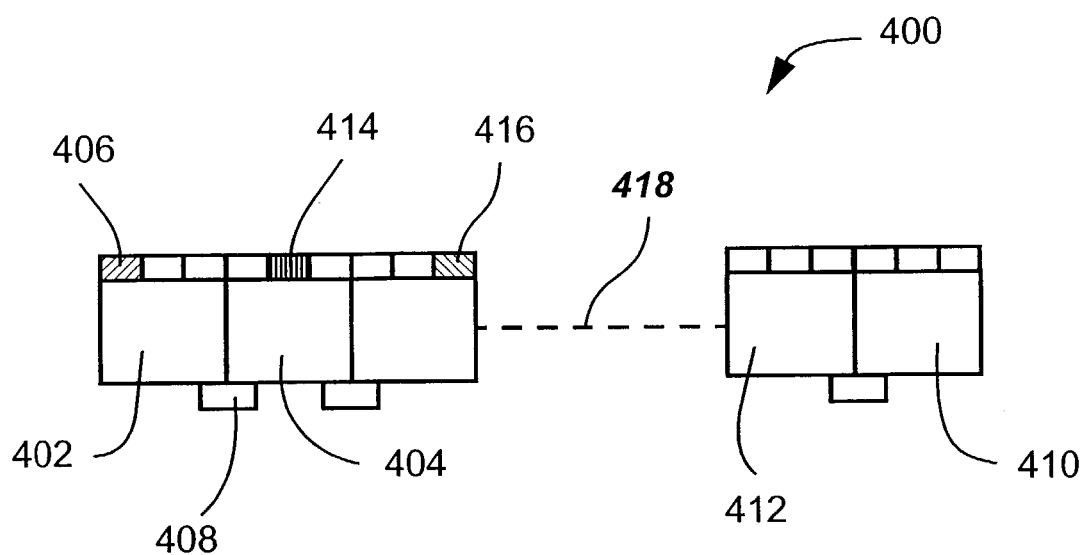
FIG. 6 depicts an exemplary presentation skeleton.

The disclosed method for automatic production of an image presentation makes use of a presentation skeleton having a number of "slots" (see FIGS. 5 and 6). A particular feature of the disclosed method is that each slot contains a sub-image set, rather than an individual image. The sub-image sets are derived from source images in the set 702, and the derived sub-image sets are optimally placed in the slots of the presentation skeleton.

Figure 2:
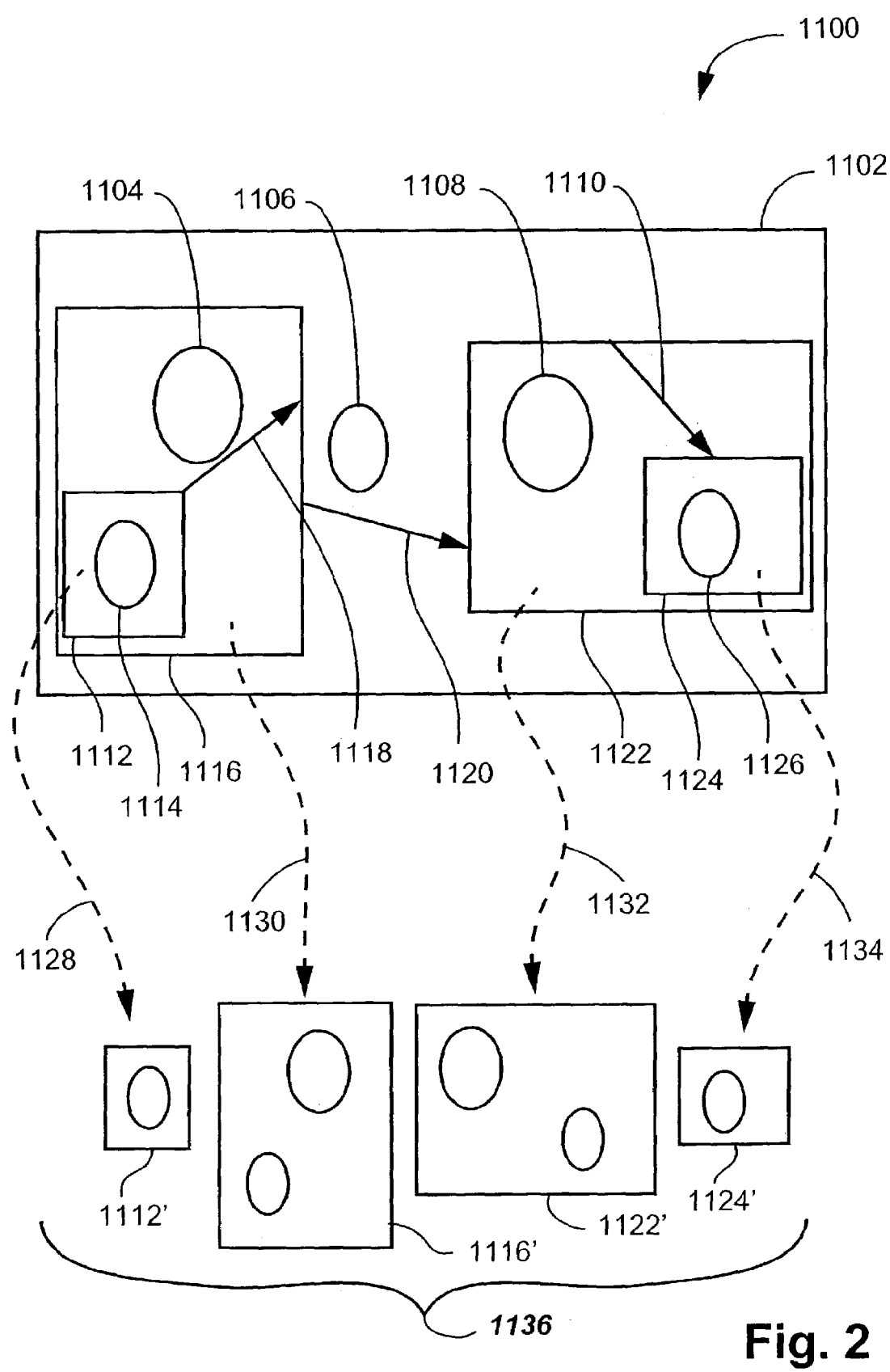
FIG. 2 shows exemplary spatial connection and effects rules used to extract sub-images from a source image.

FIG. 2 shows how an exemplary sub-image set 1136 can be derived from a specific source image 1102. The source image 1102 contains a number of faces 1114, 1104, 1106, 1108 and 1126. A "start" sub-image 1112' is derived, as depicted by a dashed arrow 1128, by placing a bounding box 1112 around the face 1114, thereby cropping the source image 1102 in order to present only the selected face 1114. Thereafter, by zooming out as depicted by an arrow 1118, a bounding box 1116 is described around the faces 1114 and 1104. The faces 1114 and 1104 form, as depicted by a dashed arrow 1130, a second sub-image 1116'. Thereafter, by panning across the image 1102 as depicted by an arrow 1120, a bounding box 1122 is described around the faces 1108 and 1126, and these faces form, as depicted by a dashed arrow 1132, a third sub-image 1122'. Finally, by zooming in as depicted by an arrow 1110, a bounding box 1124 is described around the face 1126, and this face 1126 forms, as depicted by a dashed arrow 1134, an "end" sub-image 1124'.

The four sub-images 1112', 1116', 1122' and 1124' form the exemplary sub-image set 1136 which has been derived from the source image 1102. It will be apparent that more than a single sub-image set can be derived from a source image by appropriate cropping, where the cropping boundaries are determined by characteristics of the source image. Such characteristics can, for example, relate to whether the source image is a close-up or a far-shot, or can relate to how many faces the image contains. These characteristics determine an appropriate set of effects to be used (eg. zoom out, pan, and zoom in as described with reference to FIG. 2). The selected set of effects guide the placement of the cropping boundaries for the sub-images. As will be explained in more detail in regard to FIG. 10, the selection and order of sub-image sets in the slots of the presentation skeleton are optimized by matching an "end" sub-image of a sub-image set in a particular slot, with a respective "start" sub-image in the sub-image set being considered for the succeeding (ie. adjacent) slot. Although the description just presented has been directed towards extracting faces in a source image for use in a presentation, the same technique can be used to present a panoramic pseudo-video effect when applied to features in a landscape source image.

Figure 3:
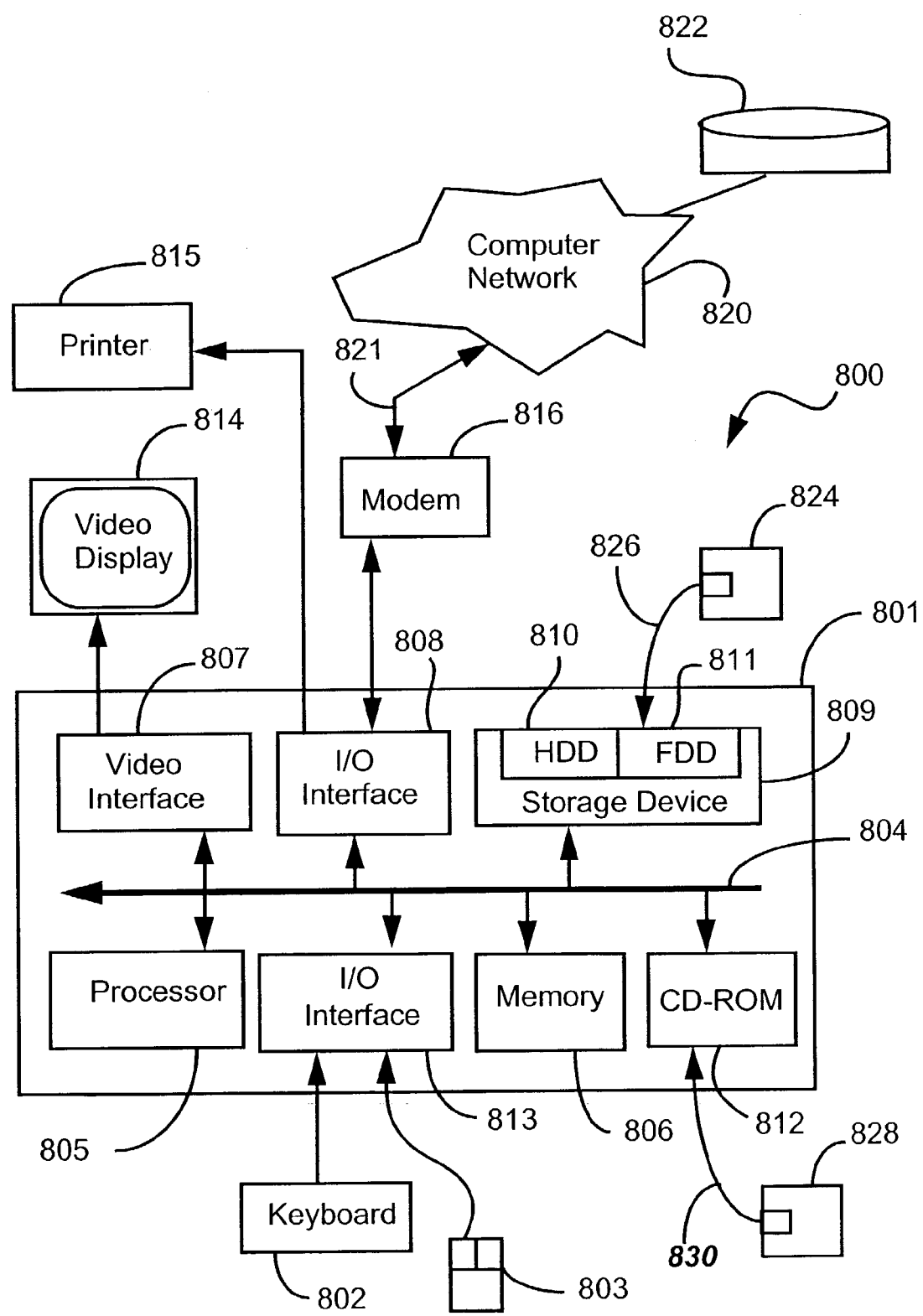
FIG. 3 is a schematic block diagram of a general purpose computer upon which the described method for compiling images can be practiced.

FIG. 3 shows how the methods of automatic image presentation and of selection and ordering of images is preferably practiced using a general-purpose computer system 800. In the system 800 the processes of FIGS. 4, 5, 7, 9, 10, 12, 13, 14 and 16 may be implemented as software, such as an application program executing within the computer system 800. In particular, the steps of the method of automatic image presentation and of selection and ordering of images are effected by instructions in the software that are carried out by the computer. The software may be divided into two separate parts; one part for carrying out the automatic image presentation methods; and another part to manage the user interface in the form of the GUI 1010 (See FIG. 1) between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for automatic image presentation and of selection and ordering of images.

The computer system 800 comprises a computer module 801, input devices such as a keyboard 802 and mouse 803, output devices including a printer 815 and a display device 814 on whose screen a presentation 1408 can be displayed. A Modulator-Demodulator (Modem) transceiver device 816 is used by the computer module 801 for communicating to and from a communications network 820, for example connectable via a telephone line 821 or other functional medium. The modem 816 can be used to obtain access to the database 822 over the Internet, and other network systems, such as a Local Area Network (LAN) or a Wide Area Network (WAN).

The computer module 801 typically includes at least the one processor unit 805, a memory unit 806, for example formed from semiconductor random access memory (RAM) and read only memory (ROM), input/output (I/O) interfaces including a video interface 807, and an I/O interface 813 for the keyboard 802 and mouse 803 and optionally a joystick (not illustrated), and an interface 808 for the modem 816. A storage device 809 is provided and typically includes the hard disk drive 810, and a floppy disk drive 811 capable of receiving, as depicted by an arrow 826, a floppy disk 824. A magnetic tape drive (not illustrated) may also be used. A CD-ROM drive 812 capable of receiving, as depicted by an arrow 830, a CD-ROM 828, is typically provided as a non-volatile source of data. The components 805 to 813 of the computer module 801, typically communicate via an interconnected bus 804 and in a manner that results in a conventional mode of operation of the computer system 800 known to those in the relevant art. Examples of computers on which the described arrangements can be practised include IBM-PC's and compatibles, Sun Sparcstations or alike computer systems evolved therefrom.

Typically, the application program is resident on the hard disk drive 810 and read and controlled in its execution by the processor 805. Intermediate storage of the program and any data fetched from the network 820 may be accomplished using the semiconductor memory 806, possibly in concert with the hard disk drive 810. In some instances, the application program may be supplied to the user encoded on the CD-ROM 828 or the floppy disk 824 and read via the corresponding drives 812 or 811, or alternatively may be read by the user from the database 822 over the network 820 via the modem device 816. Still further, the software can also be loaded into the computer system 800 from other computer readable medium including magnetic tape, a ROM or integrated circuit, a magneto-optical disk, a radio or infra-red transmission channel between the computer module 801 and another device, a computer readable card such as a PCMCIA card, and the Internet and Intranets including email transmissions and information recorded on websites and the like. The foregoing is merely exemplary of relevant computer readable mediums. Other computer readable media may alternately be used.

The methods of automatic image presentation and of selection and ordering of images may alternatively be implemented in dedicated hardware such as one or more integrated circuits performing the functions or sub functions of automatic image presentation and of selection and ordering of images. Such dedicated hardware may include graphic processors, digital signal processors, or one or more microprocessors and associated memories, which may be contained in a dedicated platform such as a camcorder or digital disk recorder.

Figure 4:
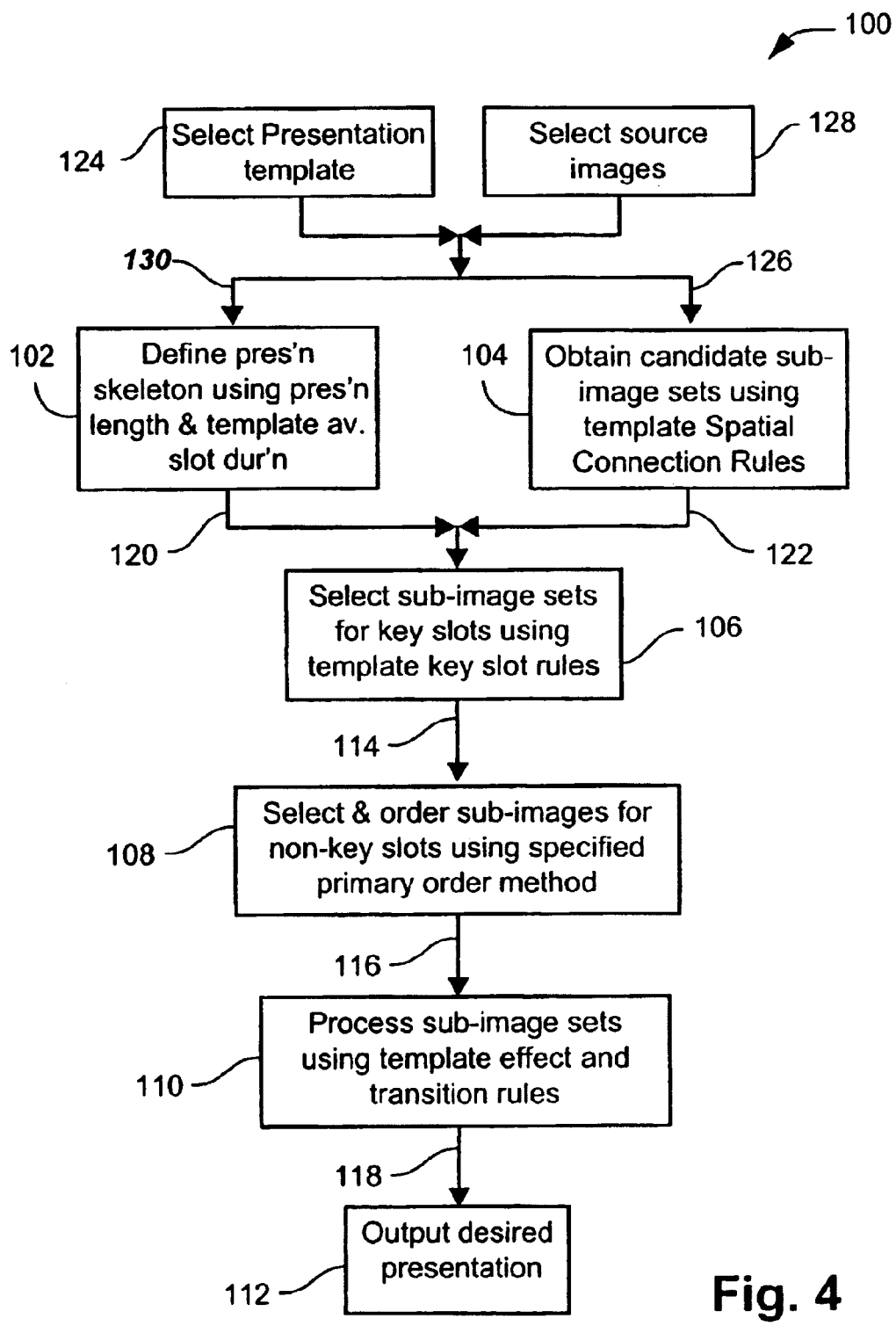
FIG. 4 shows a flow-chart for compiling images for presentation.

FIG. 4 shows a flow-chart 100 of method steps for compiling images for presentation. As a first prerequisite for the method 100, the user selects, at a step 124, the (exemplary) presentation template 1014. The template 1014 is typically stored on the hard drive 810 in the PC system 800, and is accessed by the processor 805, as needed. Alternatively, the template 1014 can be stored in the remote database 822 that is accessed by the PC system 800 over the network 820. The method 100 is largely controlled by the template 1014, however optional manual inputs from the user can also be incorporated. An exemplary template in Extended Markup Language (XML) is contained in Appendix A. The template in Appendix A is a specific instance of a template that conforms to an XML template Schema that is provided in Appendix B.

As a second pre-requisite for the method 100, the user also selects, at a step 128, the set of source images 702. This can be achieved by the user selecting a directory containing the required set of source images. Once the user has selected the desired source images 702 from which the presentation is to be compiled, and the template 1014 which is to direct the presentation compilation, the method 100 commences with two steps designated 102 and 104.

The step 102 defines a presentation skeleton 400 (see FIG. 6) upon which the presentation is built. A pictorial representation of the skeleton 400 is described in relation to FIG. 6. A process by which the skeleton 400 is defined is described in more detail with reference to FIG. 5.

The step 104 operates on the set of source images 702 (see FIGS. 7 and 8), using a set of spatial connection rules. This produces (see FIG. 8) candidate groups 742, . . . , 744 of sub-image sets 718, . . . , 720, and 722, . . . 724, that are stored in the memory 806 of FIG. 3.

Once the presentation skeleton 400 has been defined in the step 102, and the candidate groups of sub-image sets have been provided in the step 104, the method 100 is directed to a step 106 that selects sub-image sets from the candidate groups 742, . . . , 744. These selected sub-image sets are assigned to key image slots in the presentation skeleton 400 in accordance with key-slot rules specified in the template 1014.

The template 1014 defines the key slots in the presentation skeleton 400, as well as defining the associated properties of the key slots. In one example, the first and last slots of the presentation skeleton 400 are defined as key slots, and sub-image sets are selected for these key slots. One or more sub-image sets can also optionally be selected to occupy intermediate key slots between the first and last key slots. The number, attributes and positions of the key and intermediate key slots, if present, are defined in the template 1014, as will be described in more detail in respect to FIG. 5.

After sub-image sets chosen from those selected in the step 104 have been assigned to key slots in the step 106, the process 100 is directed in accordance with an arrow 114 to a step 108 that selects and orders, from the candidate groups 742, . . . , 744 of sub-image sets (see FIG. 8), sub-image sets for non-key slots in the presentation skeleton 400. "Boundary matching criteria" and "temporal connection rules" can be used in a suitable optimisation method to provide a "best" selection and order of sub-image sets. The boundary matching criteria are criteria applied only to respective end and start sub-images in adjacent slots in the presentation skeleton, whereas temporal connection rules apply to all sub-images in a presentation. When only boundary matching criteria are used, the optimisation is referred to as "local optimisation". When both boundary matching criteria and temporal connection rules are used, the optimisation is referred to as "global". This is explained in more detail in regard to FIG. 10.

An extract from the template in Appendix A that relates to the method to be used for selecting and ordering sub-image sets for other slots in the presentation skeleton is as follows:

<primaryOrder method="other"> [1]

where the effect of [1] is to define the "primary order method" used for selecting and ordering sub-image sets in the non-key slots of the presentation skeleton 400. In the present example, the primary order method is defined as "other" which leads to use of the optimisation method which is described hereafter. The exemplary template schema in Appendix B permits use of other primary order methods including chronological ordering, and user ordering.

The boundary matching criterion is referenced by the template 1014, but is defined and stored separately from the template, for example in the hard disk drive 810. The temporal connection rules are defined in the template 1014. User input can also be incorporated in the optimisation process. Thus for example, the user can select the desired order in which input images are to be used in the presentation. The optimisation method will, in this case, select the optimal sub-image sets in a manner that is constrained by the aforementioned user selection. A "nearest neighbour" method of optimisation, suitable for use in the step 108, is described in more detail in regard to FIG. 10. This local optimisation example uses only boundary matching criteria, and makes no use of temporal connection rules. Another optimisation example, using a genetic algorithm, is described in relation to FIGS. 11 to 17.

After selection in the step 108 of the sub-image sets for the non-key slots in the presentation skeleton 400, the method 100 is directed in accordance with an arrow 116 to a step 110 that performs further post-processing of the sequence of sub-image sets that have been incorporated into the presentation skeleton 400. In particular, the step 110 applies image effects (which have been determined in the step 104), and determines and applies inter-image transitions between the various sub-images in the sub-image sets which have been allocated to the slots in the presentation skeleton. Thereafter, the process 100 terminates with a step 112 that outputs the desired presentation, for example via the GUI 1010.

The application of the slot effects and the inter-slot transitions, determined in the step 104 and the step 110 respectively, are based respectively on effect rules and transition rules which are defined in the template 1014. These rules are typically presentation specific, and accordingly different presentation types utilise different rules. Application of image effects and inter-image transitions will be described in more detail with reference to FIG. 19.

The template 1014 typically comprises presentation guidelines that codify the experience of experienced editing professionals. These guidelines include (i) guidelines relating to the overall style of presentation selected, and (ii) the metadata required for the source images from which the presentation is to be drawn. The guidelines further include (iii) guidelines (rules) for spatial connections to be used in the step 104 for sub-image derivation, and (iv) rules (including the temporal connection rules) to be used in selecting sub-images in the steps 106–108 for various image slots in the presentation skeleton 400. The guidelines further include (v) rules for applying slot effects and inter-slot transitions in the step 110 to the various selected sub-images. Optional user inputs can also be used in order to modify or augment the template guidelines.

Present-day digital cameras increasingly provide metadata for the images that are captured by the camera. This metadata can include camera-based information on a per-image basis such as shutter speed. Additional metadata relating to the images can be derived either on-camera, or by employing suitable off-line post-processing, in order to obtain metadata relating to image content. Considering, for example, images of people's faces, metadata can relate to the number of faces in an image, the relative location of the faces within the image, position of eyes and other facial features within each face and so on. Face locations and size can be defined by bounding boxes, while eye positions can be represented by co-ordinates of a centre pixel of each eye. Faces and eyes can be detected by image analysis methods.

The aforementioned type of metadata is considered to be "low-level", and is based on detection of each face in an isolated manner, followed by detection of eyes within the face. A "higher-level" type of metadata relates to classification of image content relating to "face-groups". Such face groups include single faces, couples, trios, pyramid face groups, line-up face groups, and stack face groups as shown, for example, in FIG. 18. An example of image metadata is contained in Appendix D, and an XML Schema of which the exemplary metadata in one instance, is contained in Appendix E.

FIG. 5 shows a flow-chart of method sub-steps for the step 102 in FIG. 4 that defines the presentation skeleton 400. The process 102 commences with a sub-step 202 that determines a desired duration for the image presentation. This duration can be selected manually, or alternately, a default duration defined in the template 1014 can be used. An extract from the template in Appendix A that relates to the duration of the image presentation is as follows:

<avgSlotDuration>PT3S</avgSlotDuration> [2]

where [2] defines an average slot duration in the presentation to be three seconds. This is an average duration only, and actual slot widths may vary in the final presentation.

Thereafter, the process 102 is directed to a sub-step 204 that determines the number of image slots that are available in the presentation skeleton 400, using the duration determined in the sub-step 202, and an average slot duration for which each image in the presentation is to be presented. Thereafter, the process 102 is directed to a sub-step 206 that determines locations and properties of key slots in the presentation skeleton 400 as established by the template 1014.

Extracts [3] and [4] are examples of slot rules in the template in Appendix A that relate to the location and properties of key slots. The template in Appendix A defines one key slot as follows:

```
<keySlot>
    <slotPosition>first</slotPosition>
    <properties>
        <quality>high</quality>
        <faceGroup>single</faceGroup>        [3]
        <contrast>high</contrast>
        <effect>
            <duration>PT2S</duration>
            <type>zoomIn</type>
        </effect>
    </properties>
</keySlot>
``` where [3] defines the first slot in the presentation as a key slot. The key slot in this example requires a "single face" type of sub-image set, having a high contrast, and the slot has a duration of 2 seconds, and incorporates a "zoom-in" effect. The various types of face groups are described in relation to FIG. 18. The template defines another key slot as follows:

```
<keySlot>
    <slotPosition>last</slotPosition>
    <properties>
        <quality>high</quality>
        <faceGroup>stack</faceGroup>         [4]
        <contrast>high</contrast>
        <effect>
            <duration>PT2S</duration>
            <type>zoomOut</type>
        </effect>
    </properties>
</keySlot>
``` where [4] defines the last slot in the presentation as a key slot. This key slot requires a "stack" group sub-image set, having a high contrast, and the slot has a duration of 2 seconds, and incorporates a zoom-out effect.

Once the locations and properties of the key slots have been determined according to the slot rules in the template, sub-image sets are selected for the key slots on the basis of the aforementioned key slot rules. In the present arrangement, no optimisation is performed in selecting sub-image sets for the key slots. Accordingly, the sub-image sets in the groups 742, ..., 744 (see FIG. 8) are searched for sub-image sets which meet the criteria for each key slot, and the first sub-image sets which meet these criteria are selected.

FIG. 6 provides a pictorial representation of the presentation skeleton 400 that is defined in the step 102 of FIG. 4. The elements of the presentation skeleton 400 are typically (i) a sequence of image slots, (ii) inter-slot transitions between at least some adjacent image slots, and (iii) image effects that can be applied within some or all image slots. The presentation skeleton 400 comprises a sequence of image slots 402, 404, ..., 412 and 410. In accordance with the template slot rules which were described in relation to FIG. 5, the first slot 402 is defined as a key image slot, and the final slot 410 is defined as a key image slot. An inter-slot transition 408 is interposed between the end sub-image of the sub-image set in the slot 402 and the start sub-image of the sub-image set in the slot 404. The template in Appendix A only provides for cross-fade transitions, however, the template schema in Appendix B provides for other transitions such as "fade-to-black", "fade-to-white", and so on. Slot effects are depicted pictorially by shaded rectangular segments above each slot. A first example of an effect 406 is a "zoom-in". A second example of an effect 414 is a "zoom-out" effect, and a third example of an effect 416 is a "tilt-up". Effects and transitions can be applied as desired, and there are no restrictions provided that the desired effects and transitions fall within the compass of the template being used.

Figure 7:
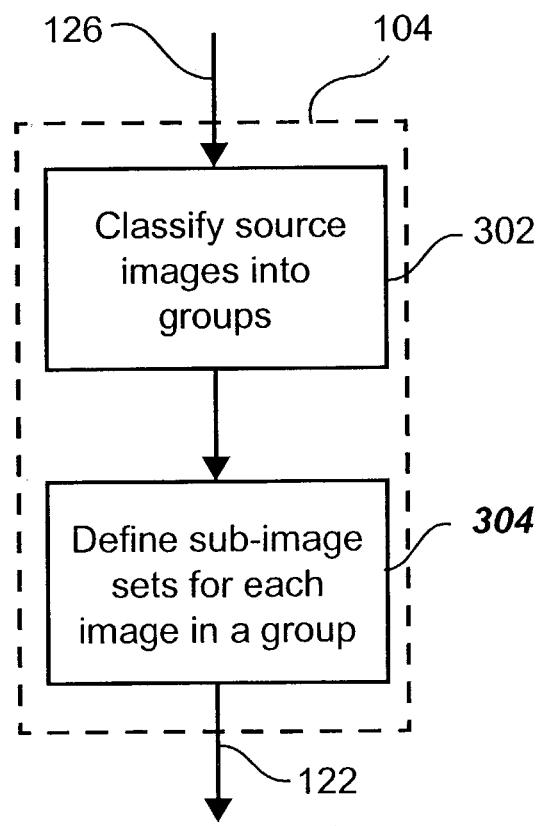
FIG. 7 shows a flow-chart for applying spatial connection rules to a set of source images.

FIG. 7 shows a flow-chart of method sub-steps showing, in more detail, the step 104 that has been described in relation to FIG. 4 for obtaining the groups 742, . . . , 744 of candidate sub-image sets from the set of source images 702 using the spatial connection rules. The step 104 commences with a sub-step 302 that classifies the source images 702 into groups, this being described further in regard to FIGS. 8 and 9. The classification sub-step 302 makes use of image metadata specifications in the template 1014, and uses the classification scheme shown in Appendix C. In this regard, reference should also be made to Appendix D which contains an example of image metadata, and appendix E which contains an example of a schema for image metadata.

The process 104 is then directed to a sub-step 304 that defines sub-image sets for each source image in a group, using the spatial connection rules in the template 1014 to edit, crop, and size images in the classified groups in order to derive the candidate sub-image sets. The spatial connection rules are dependent upon the type of presentation that is desired, and these rules form the basis for image editing, sizing and cropping. The spatial connection rules make use of various "image shot" types, as described in Appendix C. Having regard to a presentation referred to as a Standard Tribute presentation, an example of spatial connection rules are provided in the template in Appendix A.

An extract from the template in Appendix A that applies spatial connection rules to derive a sub-image set from a source image is as follows:

```
<spatialConnectionRule>
    <pattern>
        <faceGroup>single</faceGroup>
    </pattern>
    <action>
        <cropSpec>                                        [5]
            <startSubImage
numberOfFaces="1">mediumShot</startSubImage>
            <endSubImage
numberOfFaces="1">mediumCloseUp</endSubImage>
        </cropSpec>
    </action>
    ...
</spatialConnectionRule>
``` where [5] crops a source image containing a single face to thereby extract a start sub-image for a sub-image set which is a "medium shot" as defined in Appendix C. The code fragment [5] also provides an end sub-image for the sub-image set which is a "medium close-up" by cropping the source image appropriately. In the present example, therefore, the sub-image set comprises only the start sub-image and the end sub-image, and does not contain any intermediate sub-images such as were described in relation to FIG. 2. This however is merely an example, and does not import any limitation on how many sub-images, additional to the start and end sub-images, can be contained in a sub-image set. Accordingly, the step 304 can, by applying spatial connection rules, extract a number of sub-images from a given source image, to thereby obtain either a single sub-image set, or a number of sub-image sets.

Figure 8:
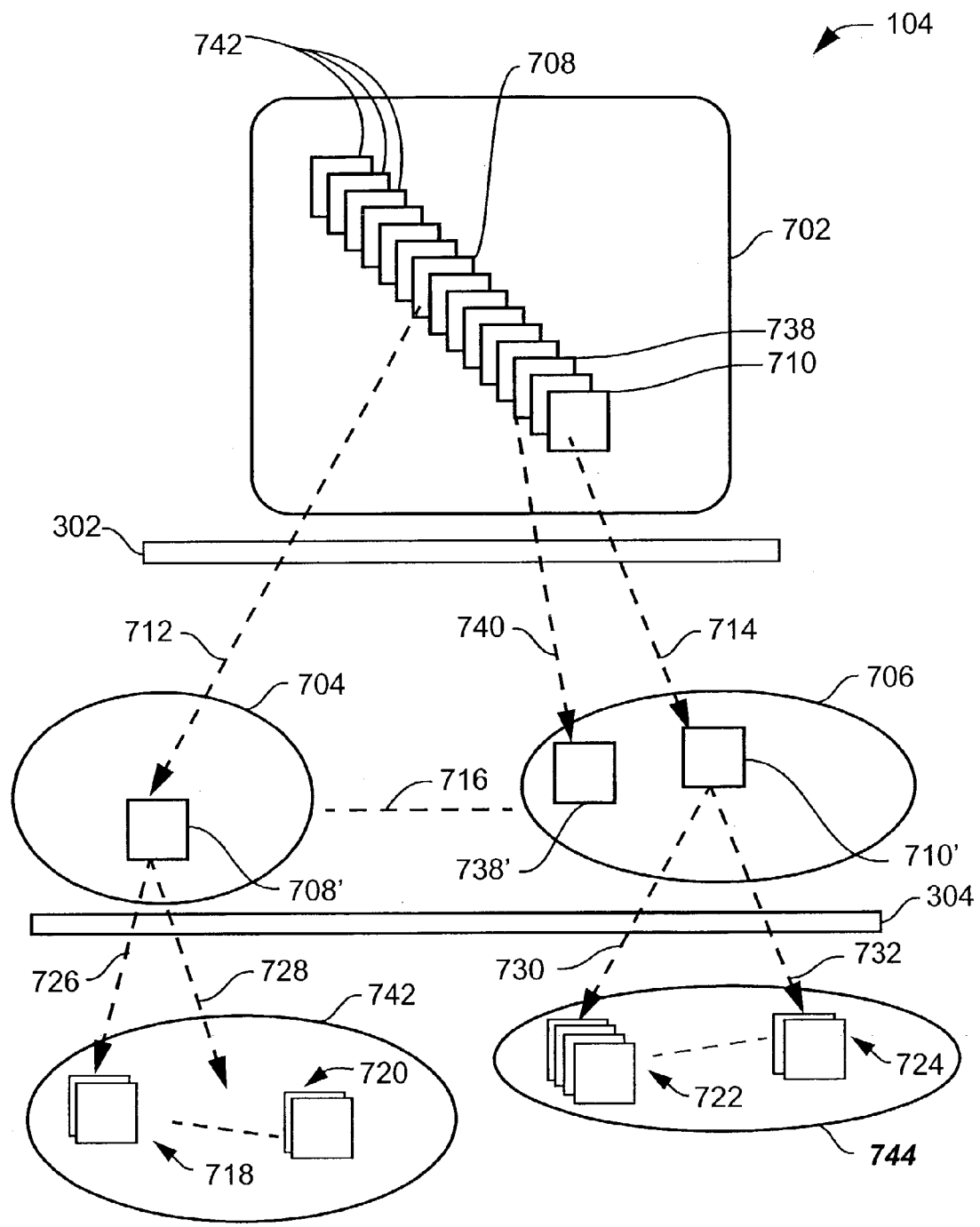
FIG. 8 depicts functional classification of a source image set into groups of candidate sub-image sets.

FIG. 8 provides a pictorial representation of the process 104 of FIG. 4 that spatially processes the source images 702 to obtain the groups 742, . . . , 744 of candidate sub-image sets. The source image set 702 consists of a number of images 742. The source image set 702 is subjected to the classification process 302 (see also FIG. 9) by which, for example, an indicative member 708 of the image set 702 is allocated, as depicted by a dashed arrow 712, to a "single faces" group 704. The allocated image is given a corresponding reference numeral 708'. Another image 738 in the source image set 702 is allocated, as indicated by a dashed arrow 740, to a "line-up faces" group 706, and is given a corresponding reference numeral 738'. Another image 710 in the source image set 702 is allocated, as indicated by a dashed arrow 714, to the line-up faces group 706, and is given a corresponding reference numeral 710'. The classification method 302 thus classifies each image 742 in the source image set 702 into one of a number of classification groups. Two examples of members from these groups are shown, being the single faces group 704 and the line-up faces group 706. The number of groups can extend beyond the aforementioned two groups, as indicated by a dashed line 716. The template in Appendix A allows for a number of face classification groups as follows:

```
<faceGroup>
    <choice>single couple trio pyramid lineUp stack</choice>    [6]
</faceGroup>
``` where [6] allows for face groups comprising single faces, couples, trios, pyramid arrangements, line-ups and stacks, as will be described in more detail in regard to FIG. 18.

Once, for example, the image 710 has been allocated, as indicated by the image 710', to the line-up faces group 706, the sub-image set definition process 304 (see FIG. 7) extracts, as depicted by a dashed arrow 730, a sub-image set 722 from the classified source image 710'. The sub-image set definition process 304 also extracts, as indicated by a dashed arrow 732, a sub-image set 724 from the image 710'. In a similar manner, the sub-image set definition step 304 extracts, as depicted by respective dashed arrows 726 and 728, sub-image sets 718 and 720 from the classified source image 708' in the single faces group 704.

The serial operation in FIG. 8 of the classification process 302 and the sub-image set definition process 304 thus derives the groups 742 (containing the sub-image sets 718, . . . , 720), . . . , and 744 (containing the sub-image sets 722, . . . , 724) from the source image set 702.

It is noted that the source images in the source image set 702 are allocated to the various classification groups 704, . . . , 706 in an exclusive manner. Accordingly the image 708' that is allocated to the classification group 704 cannot also be allocated, for example, to the classification group 706. Therefore, the total number of classified source images in the set of classification groups 704, . . . , 706 is equal to the total number of source images in the source image set 702. The sub-image definition process 304, however, has a multiplying effect, typically generating more sub-image sets in total in the groups 742, 744 than there are source images in the source image set 702.

Considering a numerical example, and returning to FIG. 4, the step 104 operates on the set of source images 702 (see FIG. 8) that contains say N images. The step 104 produces the candidate sub-image sets 718, . . . , 720, . . . , 722, . . . , 724 that have, in total, Q candidate sub-image sets. In this example the desired presentation has M image slots in the presentation skeleton 400, and the presentation skeleton 400 has P key slots (P<=M<=N<Q). The step 106 selects P sub-image sets for the key slots in the presentation skeleton 400 from the candidate sub-image sets 718, . . . , 720, . . . , 722, . . . , 724 and does not replace the selected P sub-images. Accordingly, the step 108 operates initially on the sub-image sets remaining in the groups 742, . . . , 744 that are extracted from the source images that are not selected for key slots. Each successive sub-image set that is then selected for one of the remaining slots in the presentation skeleton 400 is removed from the population of sub-images in the groups 742, . . . , 744, and consequently one less sub-image set is then available for selection in regard to subsequent vacant slots in the presentation skeleton 400. A constraint that is, but need not be, imposed by the present arrangement is that only one sub-image set from each source image can be used in the presentation. Thus, for example, we note that the classified source image 710' spawns two sub-image sets 722 and 724 in FIG. 8. If, in the course of populating slots in the presentation skeleton, the sub-image set 722 is utilised, then the sub-image set 724 is automatically excluded from consideration for other slots in the presentation.

Figure 9:
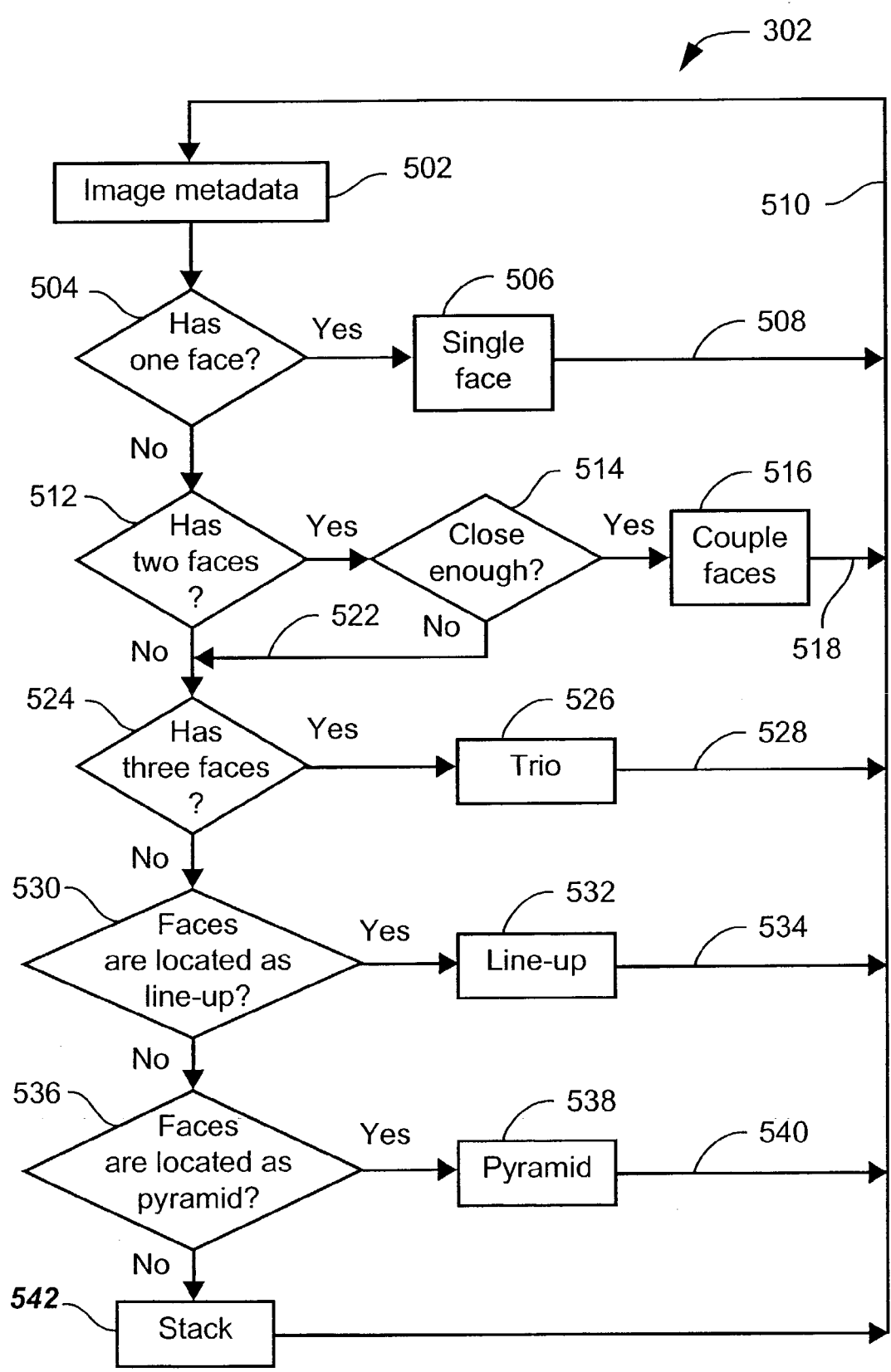
FIG. 9 depicts a flow-chart for classifying source images.

FIG. 9 is a flow-chart of method steps for classifying images using "higher-level" metadata. This is an example of a method for performing the sub-step 302 described in relation to FIG. 7. The method 302 commences with a step 502 that acquires the image metadata 1016 for the images in the source image set 702. For a particular image, a following step 504 determines whether the image being considered has a single face therein. If the image has a single face therein, then the method 302 is directed in accordance with a "yes" arrow to a step 506 that allocates the image to the single faces group 704. Thereafter, the method 302 is directed in accordance with an arrow 508 back to the step 502 that considers the next image in the source image set 702. If, on the other hand, the image being considered does not have single face, then the method 302 is directed from the step 504 to a following step 512 that tests the image for the presence of two faces.

If two faces are present in the image, then the method 302 in accordance with a "yes" arrow to a step 514 that considers whether the two faces detected are close enough to form a "couple", or alternately, whether the faces represent two separate faces. If the faces are close enough to form a couple, then the method 302 is directed in accordance with a "yes" arrow to a step 516 that allocates the image being considered to a "couple" group. Thereafter, the method 302 is directed in accordance with an arrow 518 back to the step 502. If, on the other hand, the two faces that have been detected are not close enough to represent a couple, then the method 302 is directed in accordance with an arrow 522 to the step 524.

If the image being considered has neither one, nor two faces (ie a couple), then the method 302 is directed from the step 512 in accordance with a "no" arrow to a step 524 that tests for the presence of three faces in the image. If three faces are detected, then the method 302 is directed in accordance with a "yes" arrow to a step 526 that allocates the image to a "trio" group, after which the method 302 is directed in accordance with an arrow 528 back to step 502. If, on the other hand, three faces are not detected, then the method 302 is directed from the step 524 in accordance with a "no" arrow to a step 530 that tests where the faces are located as a "line-up".

If a line-up is detected, then the method 302 is directed in accordance with a "yes" arrow to a step 532 that allocates the image to the line-up group, after which the method 302 is directed in accordance with an arrow 534 back to the step 502. If, on the other hand, a line-up is not detected, then the method 302 is directed from the step 530 in accordance with an "no" arrow to a step 536 that tests for presence of faces in a pyramid configuration. If this configuration is detected, then the method 302 is directed in accordance with a "yes" arrow to a step 538 that allocates the image to a pyramid group, thereafter directing the method 302 in accordance with an arrow 540 back to the step 502. If a pyramid configuration is not detected, then the method 302 is directed from the step 536 in accordance with an "no" arrow to a step 542 that allocates the image to a "stack" group, and thereafter in accordance with an arrow 302 back to the step 502. The method 302 terminates after all images in the source image set 702 have been considered. The various face classification groups are described in more detail with reference to FIG. 18.

Figure 10:
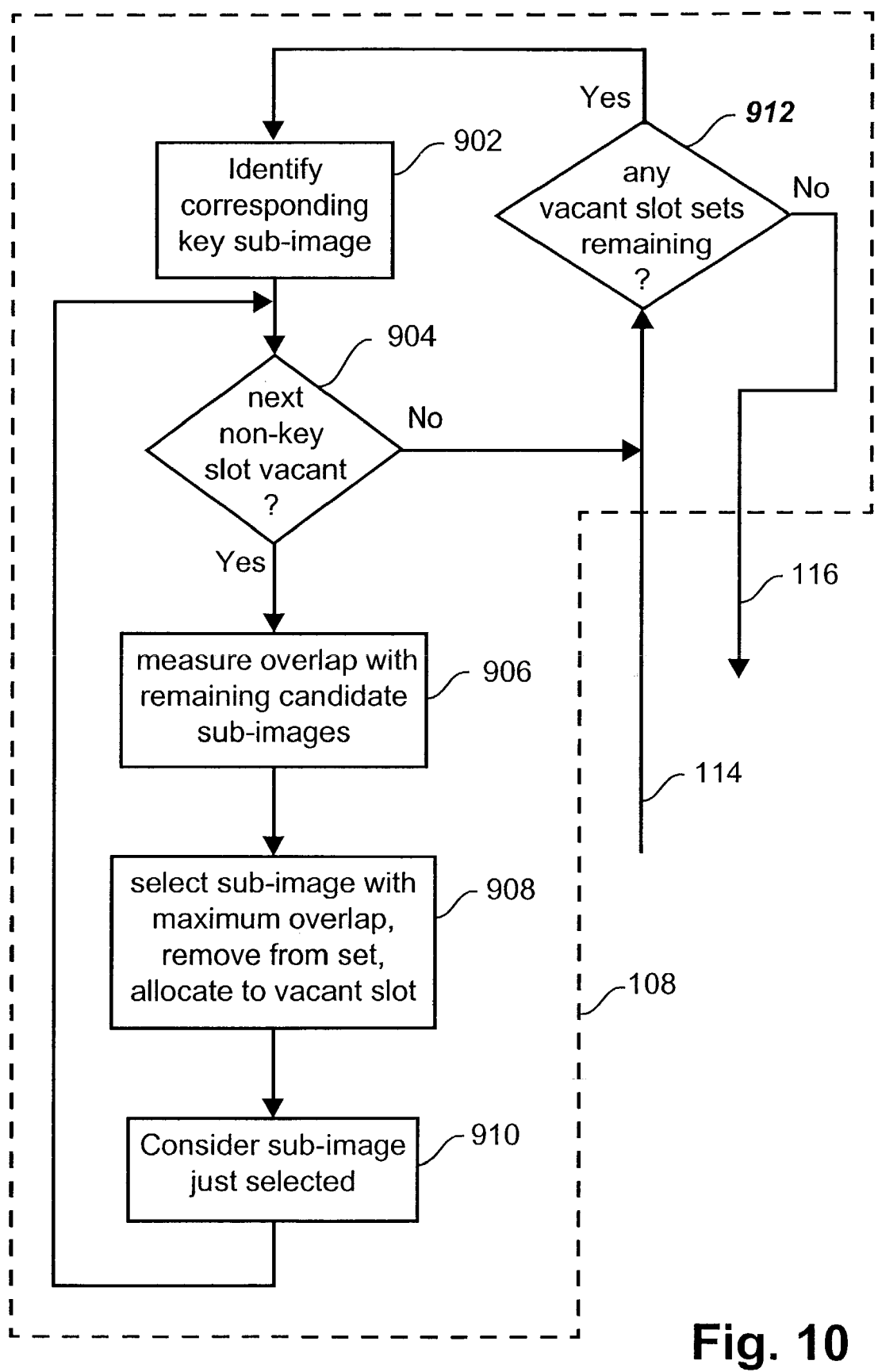
FIG. 10 shows an exemplary optimisation method for ordering and selecting sub-images.

FIG. 10 shows a first example of a method for implementing the optimisation in the step 108 described in relation to FIG. 4 for selecting sub-image sets for non-key slots in the presentation skeleton 400, after the sub-image sets have been selected for the presentation key slots in the step 106. In this example, the step 106 in FIG. 4 assigns a single sub-image set to each key slot. The optimisation method described in relation to FIG. 10 is performed in relation to these individual sub-image sets that have been placed into the key slots.

This optimisation method for selecting sub-image sets uses a fitness function according to which a fitness measure of the match between an end sub-image, say 1124' (see FIG. 2), in a slot of the skeleton, and a complementary start sub-image, say 1112' in the adjacent slot of the presentation skeleton is determined. If this boundary matching criterion is the only optimisation criterion used, then this is referred to as a local optimisation process. In this event, only the start and end sub-images in each sub-image set are considered in the optimisation process used in the step 108, and the intermediate sub-images 1116' and 1122' play no part in the optimisation process.

In another arrangement, the temporal connection rules which are specified in the template, and which apply typically to all sub-images in the sub-image sets, are incorporated into the fitness function. This constitutes a global optimisation process, and thus the effects between all or most sub-images are considered in the global optimisation.

Figure 17:
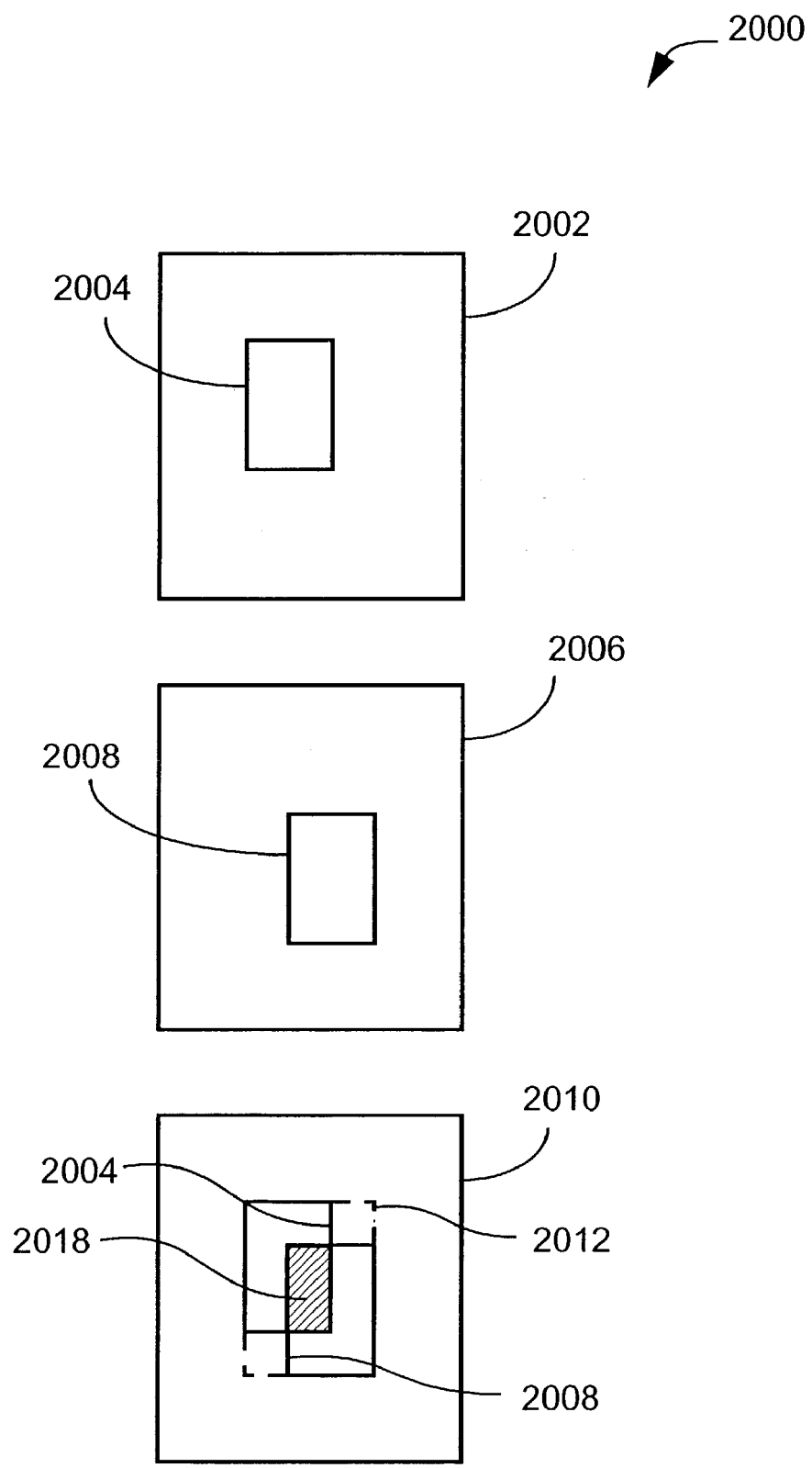
FIG. 17 depicts a pictorial representation of a fitness measure, for adjacent sub-image sets, used in the genetic optimisation process.

Considering the local optimisation case according to the first example, the determination of the match between respective end and start sub-images in adjacent slots is typically performed having regard to properties of these sub-images. Such properties of the sub-images can include location of faces, position of eyes in the face, colours of a region, shape of a region, location of an object and so on. The selection of the properties to use is typically based on the type of the presentation being considered. The fitness function is calculated on the basis of the selected properties, and is referenced in the template. The local optimisation example described in regard to FIG. 10 uses only overlap of faces as the fitness function, where increasing overlap denotes a "better" outcome. FIG. 17 provides further detail in regard to this measure.

The process 108 commences with a testing step 912 that considers whether any vacant "slot sets" still remain in the presentation skeleton 400. A slot set is a set of contiguous slots that span two key slots. Thus, for example, in FIG. 6 the slots 402 and 410 are key slots, and the slots 404–412 represent a slot set spanning the aforementioned key slots. If a vacant slot set is available, then the process 108 is directed in accordance with a "Yes" arrow to a step 902 that identifies an end sub-image in a corresponding key slot that is associated with the vacant slot set. Assume, for example, that the method 108 is filling slots from left to right in the presentation skeleton 400 in FIG. 6. Assume further that the slot set 404–412 lying between the key slots 402 and 410 is vacant. The corresponding key slot for the aforementioned vacant slot set is that key-slot on the left of the detected vacant slot set, namely the slot 402. The method 900 then proceeds to a testing step 904 that checks whether the non-key slot 404 immediately to the right of the key slot 402 is vacant. If the slot 404 is vacant, then the method 900 is directed in accordance with a "Yes" arrow to a step 906 that measures overlap between faces in the end sub-image in the key slot 402 and faces in each of the start sub-images of the remaining candidate sub-image sets 718, . . . , 720, . . . , 723, . . . , 724. A following step 908 selects the sub-image set having maximum overlap between its start sub-image and the end sub-image in the key slot 402, this being the fittest sub-image set according to the fitness function being used. The selected sub-image set, and those selected from the same source image, are then removed from the candidate sub-image sets, and the selected sub-image set is allocated to the vacant slot 404.

As noted, the aforementioned method of seeking maximum overlap between respective end and start sub-images is referred to as the local optimisation approach. In contrast, the global optimisation approach, in addition to searching for a sub-image set having maximum overlap, also applies global criteria. Thus, for example, when a particular sub-image set is identified as having the maximum overlap, instead of merely accepting the particular sub-image set as being the optimal choice, a global criteria is also applied. If, for example, a temporal connection rule in the template in Appendix A requires that 50% of slot sub-image sets use a zoom-in effect, and the effect be distributed evenly throughout the presentation (see [7] below), then the sub-image set which is identified as meeting the maximum overlap condition is nonetheless examined in terms of whether it is consistent with the evenly distributed 50% zoom-in rule. In particular, if the sub-image set does not contain any zoom-in effects, and if the composed presentation thus far is still below the 50% zoom-in requirement and would not achieve the evenly distributed 50% zoom-in requirement by selecting the sub-image set being considered, then the particular sub-image set being considered will be rejected, notwithstanding the fact that from an overlap perspective it may be optimal. It is noted that in order to apply global optimisation criteria, effects must already have been determined in the step 104 in FIG. 4.

The following extract from the template in Appendix A illustrates the aforementioned temporal connection rules as follows:

```
<temporalConnectionRule>
    <pattern>
        <effect>zoomIn</effect>
    </pattern>
    <action>                                          [7]
        <fraction>0.5</fraction>
        <distribution>even</distribution>
    </action>
</temporalConnectionRule>
``` where [7] indicates that a zoom-in effect is to be used in the presentation, and this effect is to be present for 50% of the sub-image sets, and that the distribution of the zoom-in effect throughout the presentation is to be an even distribution.

Returning to the local optimisation example in FIG. 10, after the step 908, a step 910 uses the sub-image set just selected in the step 908 as the basis for the next overlap comparison, and the method 900 is directed back to the testing step 904 that checks whether the subsequent rightward non-key slot is vacant. In this manner, the method 900 cycles through the steps 904 to 910 successively searching for the candidate sub-image set having maximum overlap between its start sub-image and the end sub-image presently being considered, and allocating that sub-image set to the vacant slot under consideration. Once all the vacant slots 404, . . . , 412 have been filled, the testing step 904 will find that the next rightward non-key slot is not vacant, and accordingly the method 900 is directed in accordance with a "No" arrow to the step 912 that checks whether any vacant slot-sets still remain. If a vacant slot-set is found, then the method 900 is directed in accordance with the "Yes" arrow to the step 902 that considers the corresponding key slot sub-image set associated with the vacant slot-set. If, on the other hand, no vacant slot-sets remain in the presentation skeleton, then the method 900 is directed in accordance with a "No" arrow from the step 912 to the step 110 (see FIG. 1).

Figure 11:
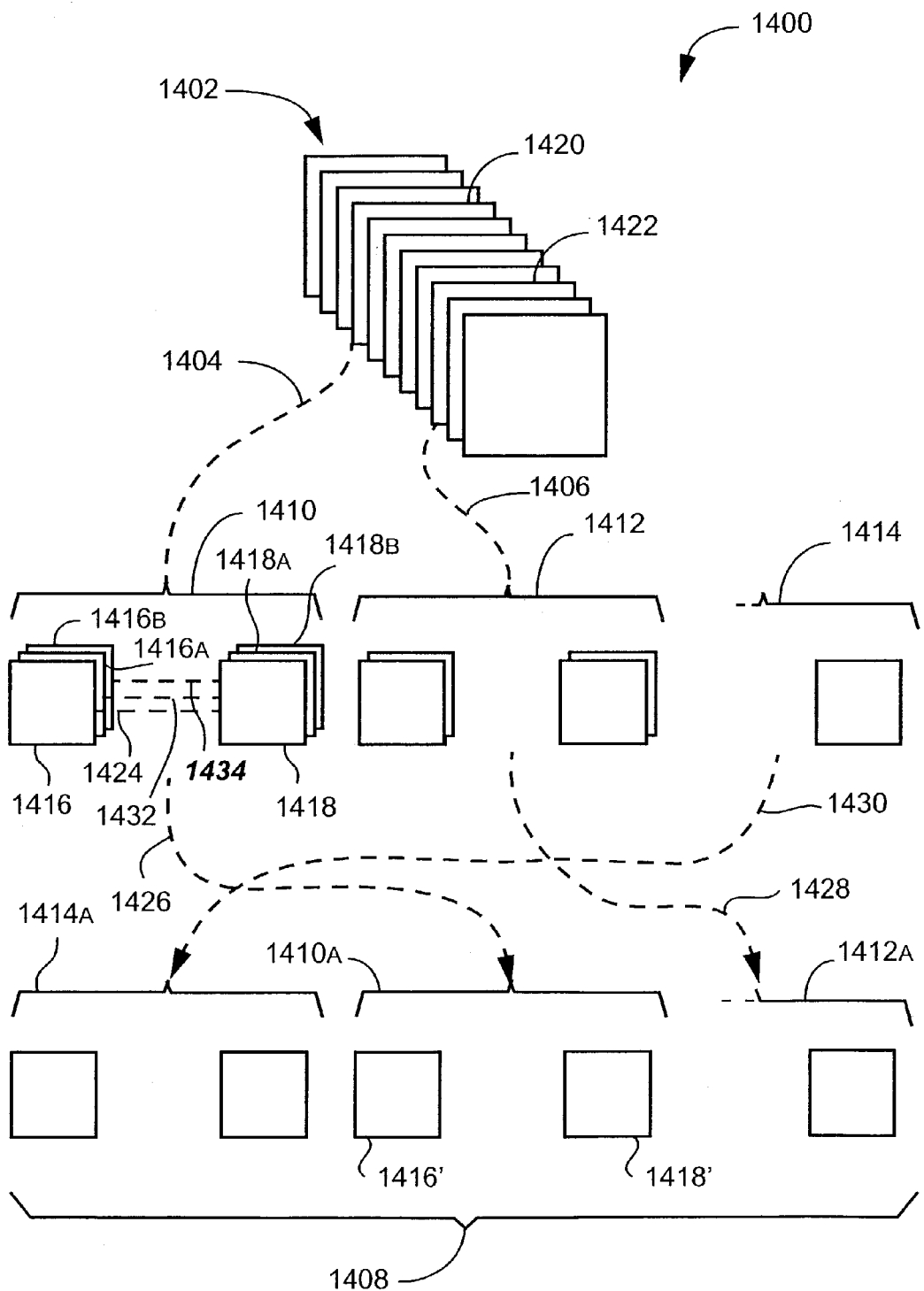
FIG. 11 shows a set of source images from which sub-image sets are to be selected for use in an image presentation.
Figure 12:
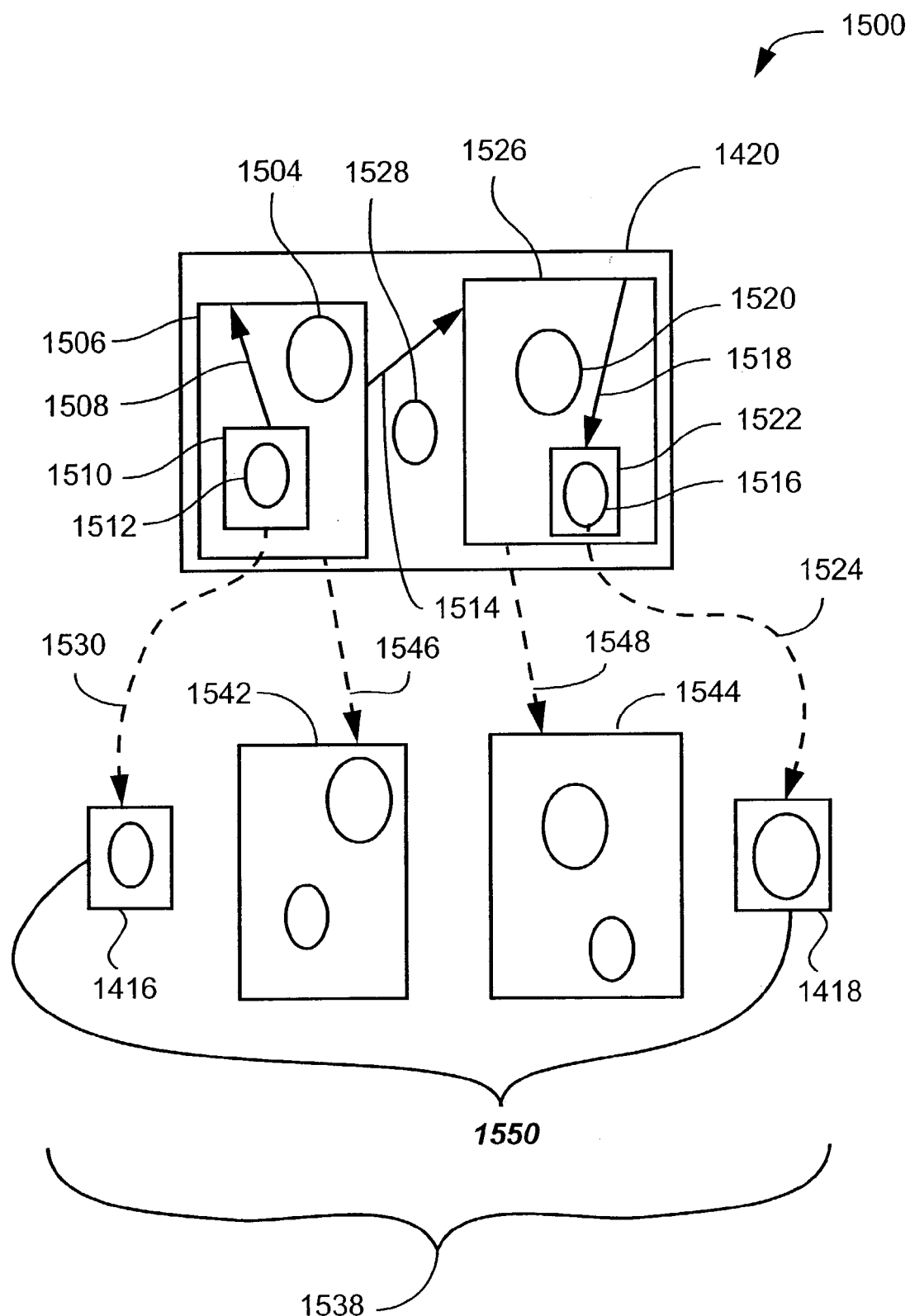
FIG. 12 shows how a sub-image set can be formed from a source image.
Figure 13:
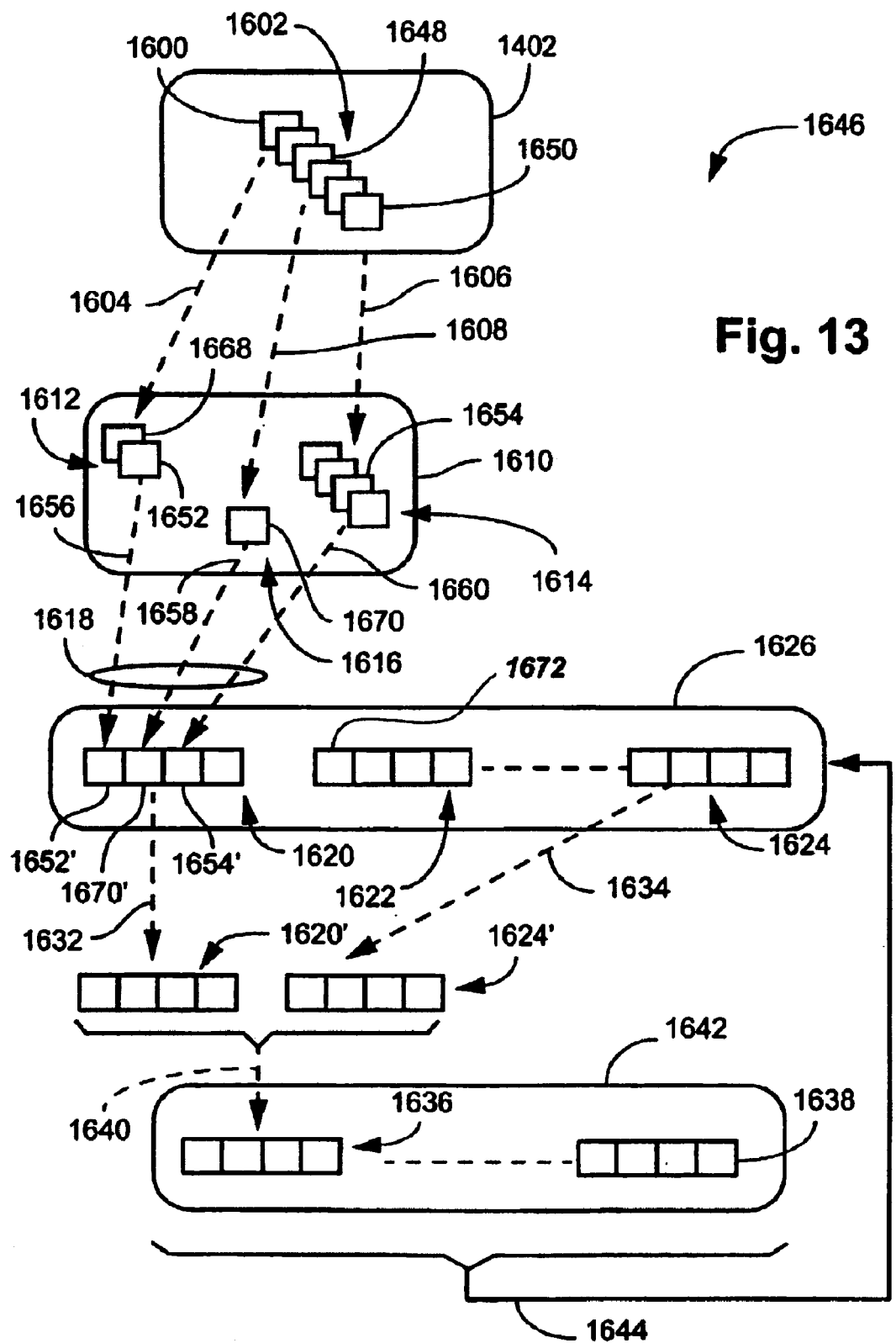
FIG. 13 depicts a process for selecting and ordering sub-image sets, from a set of source images, for an image presentation.

FIGS. 11 to 17 show a second example of a method for implementing the optimisation in the step 108 described in relation to FIG. 4 for selecting sub-image sets for non-key slots in the presentation skeleton 400, after the sub-image sets have been selected for the presentation key slots in the step 106. In this example, the step 106 in FIG. 4 again assigns a sub-image set to each key slot, however the image from which the sub-image set is derived is permanently associated to the key slot in question. Thus, for example, if the image 1420 is selected as that image to be associated with a particular key slot, then one of the group 1410 of sub-image sets is always assigned to the key slot. The optimisation method described in relation to FIG. 13 is performed under the constraint that sub-image sets assigned to the key-slot in question will always be derived from the same image 1420. In contrast, sub-image sets assigned to the non-key slots in the presentation may be chosen from the groups 1410, 1412, . . . , 1414 without regard to this constraint.

FIG. 11 shows an arrangement 1400 whereby a desired image presentation 1408 is to be compiled from a set of source images 1402. The desired image presentation 1408 is represented in FIG. 11 as comprising consecutive sub-image sets 1414a, 1410a, . . . , 1412a in a sequential arrangement from left to right. Each of the sub-image sets occupies a "slot" in the desired presentation 1408. The sequential arrangement can be along a time axis, in which case the consecutive sub-image sets are presented sequentially in time. The sequential arrangement can also, for example, be along a spatial dimension, in which case the consecutive sub-image sets are presented sequentially in space, such as along a billboard from left to right, for example.

The sub-image sets 1414a, 1410a, . . . , 1412a are derived from individual images in the source set 1402. Thus, for example, an image 1420 is mapped, as depicted by a dashed line 1404, to the group 1410 of sub-image sets. Another image 1422, is similarly mapped, as depicted by a dashed line 1406, to the second group 1412 of sub-image sets. In this manner, individual images in the set 1402 of source images are mapped to the groups 1410, 1412 . . . , 1414 of sub-image sets from which the desired image presentation 1408 is selected.

The first group 1410 of sub-image sets is seen to comprise three sub-image sets. A first sub-image set has a start sub-image 1416, an end sub-image 1418, and possibly a number of other interposed sub-images depicted by a dashed line 1424. A second sub-image set has a start sub-image 1416*a*, an end sub-image 1418*a*, and possibly a number of other interposed sub-images depicted by a dashed line 1432. A third sub-image set has a start sub-image 1416*b*, an end sub-image 1418*b*, and possibly a number of other interposed sub-images depicted by a dashed line 1434. The other groups 1412, . . . , 1414 of sub-image sets comprise two and one sub-image sets respectively. In general, therefore, each image such as 1420 in the set 1402 of source images can spawn one or more sub-image sets. As will be described in relation to FIG. 12, the start and end sub-images are of primary interest, and the interposed sub-images will only be referred to if necessary.

Once the groups 1410, 1412, . . . , 1414 of sub-image sets have been derived from the set 1402 of source images, the groups are used in different ways in regard to the key slots and the non-key slots. Sub-image sets assigned to a particular key slot are always selected from the same group of sub-image sets, which in turn is derived from the same image. Sub-image sets assigned to a particular non-key slot can be selected from any group of sub-image sets. Accordingly, in an example where the member 1410*a* is a key slot, and the members 1414*a*, and 1412*a* of the presentation are non-key slots, FIG. 11 shows one example of how sub-image sets are assigned. It is seen that the sub-image set having the start sub-image 1416 and end sub-image 1418 is selected, as depicted by a dashed arrow 1426, to be the second member 1410*a* of the desired presentation 1408. Sub-image sets for the non-key slots 1414*a* and 1412*a* are selected as depicted by respective dashed arrows 1430 and 1428 from the groups 1414 and 1412. The sub-image sets for the non-key slots 1414*a* and 1412*a* could just as easily have been selected in a reverse fashion from the groups 1412 and 1414 respectively, however the sub-image sets for the key-slot 1410*a* must be derived from the group 1410.

It is noted that transitions can be applied between adjacent images in the sub-sets 1414*a*, 1410*a*, . . . , 1412*a*, and effects can also be applied to the individual images in the sub-image sets.

FIG. 12 shows one approach that can be used for deriving sub-images from the source image 1420. In the approach 1500 shown, the source image 1420 is mapped to four sub-images 1416, 1542, 1544 and 1418, together comprising a sub-image set 1538, in the following manner. The editor in the present instance wishes to commence the presentation by showing a face 1512 from the source image 1420, and accordingly the editor positions a bounding box 1510 around this face 1512. The editor then zooms out, as depicted by an arrow 1508 to the faces 1504 and 1512 by positioning a second bounding box 1506 around these faces 1504 and 1512. Thereafter, the editor pans across the source image 1420, as depicted by an arrow 1514, to thereby position a bounding box 1526 around faces 1520 and 1516. Finally, the editor zooms in as depicted by an arrow 1518 to position a bounding box 1522 around the face 1516.

Each of the aforementioned bounding boxes can be used to delimit a corresponding sub-image in the desired sub-image set 1538. Accordingly, the first bounding box 1510 is mapped, as depicted by a dashed arrow 1530, to the start sub-image 1416. The second bounding box 1506 is similarly mapped as depicted by a dashed arrow 1546, to the intermediate sub-image 1542. The third bounding box 1526 is mapped, as depicted by an arrow 1548 to an intermediate sub-image 1544 in the desired sub-image set 1538. The last bounding box 1522 is mapped, as depicted by a dashed arrow 1524, to form the end sub-image 1418 in the sub-image set 1538.

In summary, FIG. 12 shows one approach 1500 for mapping the source image 1420 into the sub-image set 1538 that consists of the start sub-image 1416, the end sub-image 1418, and two intermediate interposed sub-images 1542 and 1544. The method that will be described for selecting and ordering sub-image sets into the desired image presentation 1408 matches corresponding start and end sub-images (exemplified by 1416 and 1418) of each successive sub-image set 1410–1414. Such start and end sub-images are referred to as "complementary" sub-images. For the sake of convenience, a start/end sub-Image Pair 1550 (consisting of the sub-images 1416 and 1418) are conveniently referred to as a "SIP" in this description. It is noted that a sub-image set 1538 always has a SIP 1550, but does not necessarily have intermediate sub-images. In fact, this specification is directed primarily at the SIPs, and not at intermediate images, and thus the intermediate images are generally not referred to in the description.

From a terminology perspective, sub-images at the "border" of a sub-image set, in other words both start sub-images and end sub-images, will be referred to as "extremity" sub-images.

The previous description has shown a particular method by which the source image 1420 can be mapped to the sub-image set 1538, however clearly other methods can also be used. Sub-image sets can be generated by using meta-data, which is associated with the source images, in order to determine the location of human faces. Thereafter, predetermined artistic guidelines can be used to decide where bounding boxes should be placed to thereby form the desired sub-images. Furthermore, as noted in the description related to FIG. 12, each exemplary image 1420 in the set 1402 of source images can spawn a number of alternate SIPs.

FIG. 13 depicts a process 1646 for selecting and ordering images from the source image set 1402 to thereby form the desired image presentation 1408. The number of slots in the desired presentation 1408 can be less than, or equal to, the number of images in the set 1402 of source images, since each source image can only be used a maximum of once in the presentation 1408. The set 1402 of source images is mapped, as depicted by dashed arrows 1604, 1608 and 1606, to a set 1610 of corresponding groups 1612, 1616 and 1614 of sub-image sets. Each of the groups 1612, 1616 and 1614 comprises at least one sub-image set. Thus, for example, the group 1612 has two sub-image sets 1652 and 1668. Each sub-image set has a SIP.

A first image 1600 in the set 1402 of source images is mapped to the group 1612 that has the two sub-image sets 1652 and 1668. Another image 1648 is mapped to the group 1616 that has a single sub-image set 1670. Another image 1650 is mapped to the group 1614 that has four sub-image sets exemplified by the sub-image set 1654.

The preferred process for finding the best presentation from the source images involves creating a set of candidate presentations each being a combination of sub-image sets.

In a next step of the process 1646 a single sub-image set is selected from each of as many of the groups 1612, 1616, 1614, . . . in the set 1610, as are needed to fill the slots in a candidate presentation. For key slots in the presentation, sub-image sets are always selected from a specified group which is permanently associated with the key slot in question. Thus for example, if a slot 1652' in the presentation 1620 is a key slot, then the image 1600 is permanently associated with the key slot 1652'. Accordingly, the sub-image set selected for the key slot 1652' is always selected from the group 1612. A first candidate presentation 1620 is seen to have four "slots", each of which is to be filled with one sub-image set. Accordingly a single sub-image set is selected from each of four different groups in the set 1610, these sub-image sets being allocated to respective slots in the candidate presentation 1620. As previously noted, sub-image sets for key slots are always drawn from the associated group of sub-image sets, whereas sub-image sets for non-key slots may be chosen without this constraint.

Each candidate presentation 1620, 1622, . . . , 1624 in a population 1626 has the same number of slots, and so the same process of sub-image set selection from groups in the set 1610 is performed in respect of each candidate presentation 1620, 1622, . . . , 1624. Therefore, and having regard to the first candidate presentation 1620, the sub-image set 1652 is selected, as depicted by a dashed arrow 1656, from the group 1612, to thereby form the first sub-image set (designated 1652') in the candidate presentation 1620. The sub-image set 1670 is selected, as depicted by a dashed arrow 1658, from the group 1616, to be a second image (designated as 1670') in the candidate presentation 1620. The sub-image set 1654 is selected, as depicted by a dashed arrow 1660, from the group 1614, to be a third image (designated as 1654') in the candidate presentation 1620 and so on. This process is repeated as many times as necessary to select sub-image sets for each slot in the candidate presentation 1620, having regard to the difference in constraints applying to slots depending on whether they are key slots or non-key slots.

Accordingly, for a given key slot, say 1652', of any of the candidate presentations in the population 1626, the sub-image set is always selected from a specified sub-image set group. Thus, for example, one of the sub-image sets 1652 and 1668 in the group 1612, which is derived from the image 1600, is assigned to the first (key) slot 1652' in the presentation 1620. One of the sub-image sets 1652 and 1668 is also assigned to the first (key) slot 1672 in the presentation 1622.

In contrast, if the slot 1670' is a non-key slot, then although FIG. 13 shows that the sub-image set 1670 has been selected, as depicted by the dashed arrow 1658, from the group 1616, the sub-image for the non-key slot 1670' could as easily have been drawn from the group 1614. This is provided, of course, that a sub-image from the group 1614 had not been used in another slot in the candidate presentation 1620.

The procedures described for the key-slots and non-key slots is also adopted in order to select sub-image sets for each slot in the other candidate presentations 1622, . . . , 1624.

The number of slots in the candidate presentations can be determined on the basis of a user-defined presentation duration, together with a determination of the average time to be allocated for presenting the content of each sub-image set. The aforementioned average time can be specified in a template which is used to guide compilation of the presentation.

The selection of the individual sub-image sets 1652, 1670 and 1654 from the corresponding groups 1612, 1616 and 1614 of sub-image sets is conducted, at this stage of the process 1646, on a random basis. The only restriction on the selection is that sub-image sets for key slots are always drawn, on a random basis, from the associated group of sub-image sets, whereas sub-image sets for non-key slots may be selected from any group of sub-image sets provided that each sub-image set is only selected once in a given candidate presentation.

In the above manner, the candidate presentations 1620, 1622, . . . , 1624 are built using sub-image sets from the set 1610 of sub-image set groups. The candidate presentations 1620, 1622, . . . , 1624 form what will be referred to as the first generation, or population 1626 of candidate image presentations. A genetic optimisation process is then applied to the first generation 1626 of candidate presentations in order to "build" a new and "better" population, as is described below.

Before proceeding to describe the rest of the process 1646 in FIG. 13, some terminology relating to genetic optimisation processes is introduced. All living organisms consist of cells. In each cell there is the same set of chromosomes. Chromosomes are strings of DNA, and serve as a model for the entire organism. A chromosome consists of genes, each of which is an individual block of DNA. Each gene encodes a trait, for example colour of eyes.

The genetic optimisation process used herein is based on the principle of natural selection and evolution that is found in biological systems. The natural selection process commences with a set of member chromosomes that forms a biological population. The population then evolves by selecting members (parents) from the population to reproduce or "combine" to produce children, and the children constitute members of a new population. Parents are selected from their population on the basis of an associated "chromosome fitness", and thus a fitness measure by which the chromosome fitness of each parent can be assessed must be defined. The evolution process typically generates increasingly fit populations of chromosomes through the processes of parent selection, and reproduction or combination of parent chromosomes.

The term "fitness" is used in a number of different forms in this description. When referring to chromosomes, respective terms chromosome fitness and chromosome population fitness are used to denote the fitness of a chromosome, and a population of which the chromosome is a member. When referring to sub-image sets and candidate presentations, respective terms SIP fitness, presentation fitness, and presentation population fitness are used. SIP fitness relates to fitness of an adjacent pair of sub-image sets in a candidate presentation and is described in relation to FIG. 17 and Equation [8]. Presentation fitness refers to a fitness of the aforementioned candidate presentation, and is described in relation to Equation [9]. Presentation population fitness refers to the fitness of a population of presentations to which the aforementioned presentation belongs, and is described in relation to Equation [10].

In the present specification, the candidate presentations represent the chromosomes. A genetic optimisation process is applied to the first generation 1626 of candidate presentations, and is then iteratively applied to successive populations of children. During each successive iteration or evolutionary cycle, the children produced from combination of parents become parents themselves who can, dependent on their presentation fitness, participate in combining to form the next generation of children. Each candidate presentation (chromosome) is made up of sub-image sets (genes), as will be explained in more detail in regard to FIGS. 15A and 15B. The reproduction or combination process will be explained in more detail in regard to FIG. 16.

As noted above, the process 1646 commences by randomly generating the initial population 1626 of "n" candidate presentations (ie chromosomes) 1620, 1622, . . . , 1624. The candidate presentations (such as 1620) in the initial population 1626 comprise, for the non-key slots, randomly ordered, and randomly selected sub-image sets (ie 1670', 1654', . . . ) (see the step 108 in FIG. 4). The sub-image sets assigned to the key slots such as 1652' are also randomly selected, but this selection is only drawn from an associated sub-image set such as 1612 (see the step 106 in FIG. 4). Thereafter, parents 1620' and 1624' are selected from the population 1626, and their traits are combined to form a child 1636 for a new population 1642 comprising child candidate presentations. Although the present description considers the case of parents producing only a single child when their traits are combined, this is only exemplary, and parents can combine their traits in different ways to produce more than one child. Parents are selected on a probabilistic basis according to their corresponding presentation fitness measures, and accordingly the fitter the parents are, the greater are their chances to reproduce. The process 1646 iteratively improves the population fitness of succeeding populations of candidate presentations by preferentially selecting fit parents to be the parents of the next generation's members.

The reproduction or combination process includes sub-processes referred to as "crossover" and "mutation". Crossover refers to a mechanism for selecting particular "genetic" traits (ie sub-image sets) from each of the parents (candidate presentations) for incorporation into the children. If no crossover is performed, a child is an exact copy of one of the parents. Mutation refers to a mechanism whereby small random changes are made, typically after crossover, to the genetic structure of a child. The combination process thus includes both crossover and mutation, noting that these sub-processes occur with a respective crossover probability, and a mutation probability. Typically, crossover probabilities are relatively high, typically 90%, and mutation probabilities are relatively low, typically 0.5%. Other genetic processes such as "elitism", whereby at least one "best" parent is included in the new population, can also be included in the genetic optimisation process.

The evolution of successive populations of candidate presentations is repeated until some "stop condition", which may for example be a pre-defined number of iterations, or a pre-determined population fitness threshold, or a specified improvement in population or individual presentation fitness, is achieved. When this criterion is satisfied, the population meeting this criterion represents the "end" population, and the fittest presentation in this end population is the desired presentation.

Returning to the process 1646 in FIG. 13, the candidate presentations 1620, 1622, . . . , 1624 may be considered to be individual chromosomes in the population of chromosomes 1626. Since the population 1626 has, as explained, been selected randomly at the beginning of the process 1646, it is reasonable to assume that the stop condition has not been met, and that none of the candidate presentations 1620 to 1624 are suitable as the desired presentation. Thus, the process 1646 continues by selecting, as depicted by respective dashed arrows 1632 and 1634, the pair of parents 1620' and 1624' from the population 1626. The respective probabilities of selecting the parents 1620' and 1624' from the population 1626 is dependent upon the respective presentation fitness measures associated with the candidate presentations 1620 and 1624. The fitter a chromosome is, the greater the probability that it will be selected. Accordingly, the fittest chromosomes survive to create children. The presentation fitness measure will be described in more detail with reference to FIG. 17 and Equations [8] and [9].

The selected parents 1620' and 1624' reproduce by applying crossover and mutation, each with an associated probability, to produce the child 1636. Thereafter, the parents 1620' and 1624' are "replaced" into the population 1626, and a second pair of parents are selected from the population 1626, again dependent upon their respective presentation fitness measures.

The population 1626 of candidate presentations contains "n" members, and thus the process of selecting parents, and applying crossover and mutation to produce children, is repeated n times (for the case in which each set of parents produces a single child) until the "new population" 1642 containing n children 1636, . . . , 1638 is produced.

The presentation fitness of each child is then calculated, and if the stop condition is not met, then the process 1646 iterates as depicted by an arrow 1644. Thus, the new population 1642 becomes the population from which parents are selected in order to reproduce, thereby producing children for a newer generation and so on. At some stage in the (iterating) process 1646, the stop condition will be met, at which point a generation (being by definition the end population) of candidate presentations meets the stop condition. Once this stop condition is achieved, the candidate presentation having the best presentation fitness measure in the end population is selected as the desired presentation.

Figure 14:
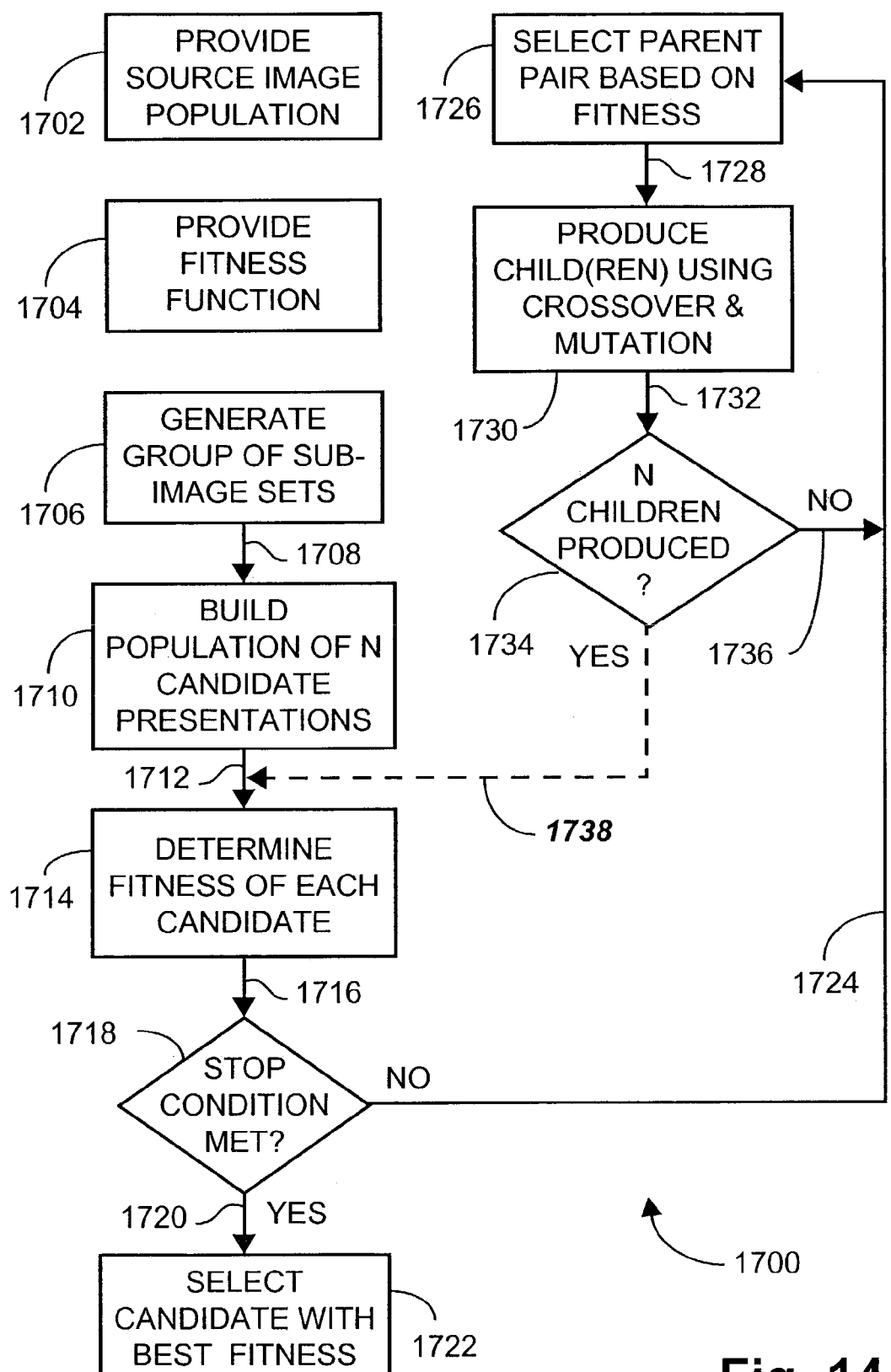
FIG. 14 depicts a flow chart of method steps for selecting and ordering sub-image sets for an image presentation.

FIG. 14 depicts a flow chart 1700 of method steps for selecting and ordering images for an image presentation. The process 1700 requires, as a prerequisite, that the source image set 1402 be provided or selected. This is depicted by a step 1702. The source images are typically stored by the editor on a PC system 1300 (see FIG. 1) in a storage device 809, or alternately, are stored in a remote database 822 that is accessed by the computer system 800 over a network 820. Furthermore, a fitness function must be defined, as depicted by a prerequisite step 1704.

Once the prerequisites 1702 and 1704 have been met, the process 1700 commences with a step 1706 that generates the set 1610 of sub-image sets from the set 1402 of source images. Thereafter, as depicted by an arrow 1708, a step 1710 builds the initial population 1626 of candidate presentations. This population 1626 of candidate presentations is built by randomly selecting a single sub-image set such as 1652' from as many respective groups of sub-image sets in the set 1610 as are needed to build the population 1626, as has been described in relation to FIG. 13. Again it is noted that the selection procedure for key slots differs from that for non key slots. Thereafter, as depicted by an arrow 1712, a step 1714 determines the presentation fitness for each candidate presentation in the population 1626 of candidate presentations. The presentation fitness is described in more detail in regard to FIG. 17 and equations [8] and [9]. The process 1700 is then directed, in accordance with an arrow 1716, to a testing step 1718 that determines whether the stop condition is met by the population 1626 of candidate presentations. The stop condition can take various forms, and can either be defined in terms of a fixed number of iterations, or alternatively, a pre-defined percentage improvement in the presentation fitness of the fittest candidate presentations.

If the step 1718 determines that the stop condition has been met, then the process 1700 is directed, in accordance with a "yes" arrow 1720 to a step 1722 that selects the candidate in the current population (ie the end population) having the best presentation fitness measure. This candidate presentation is the desired presentation for output. If, on the other hand, the stop condition is not met in the step 1718, then the process 1700 is directed in accordance with a "no" arrow 1724 to a step 1726. The step 1726 selects a pair of parents (exemplified by 1620' and 1624'), based on their respective presentation fitness measures, from the population 1626 of candidate presentations.

The "roulette wheel" selection method can be used to select the parent presentations. According to this technique, in the first instance, for each population a sum "S" of all chromosome fitness is calculated. Thereafter, a random number "r" is drawn uniformly from the interval [0,S]. Finally, a cumulative sum "s" of presentation fitness is calculated, by going through the population in descending order of fitness. When "s" is greater than "r", the parent presentation selection process terminates.

Thereafter, as depicted by an arrow 1728, the parents reproduce in a step 1730 using the sub-processes of crossover and mutation, each sub-process being applied according to a respective probability, thereby to produce a single child (in the present arrangement).

Subsequently, as depicted by an arrow 1732, a testing step 1734 determines whether n children have yet been produced, since this is the number of children required for the new population 1642. If this is the case, then the process 1700 is directed in accordance with a "yes" dashed arrow 1738 to the step 1714 which again determines the presentation fitness of each candidate presentation in the new population. If, on the other hand, the testing step 1734 determines that insufficient children have, as yet, been produced, then the process 1700 is directed in accordance with a "no" arrow 1736 back to the step 1726. The step 1726 selects a new pair of parents, again based on their respective presentation fitness measures.

The step 1702 is implemented (see FIG. 3) by the processor 805 that directs the modem 816 to establish communication with the remote database 822, to thereby download the desired source images, and the processor 805 stores the source images locally on the hard drive 810. The fitness function of the step 1704 is downloaded from the remote database 822 in the same manner. The step 1706 is implemented by the processor 805, which operates upon the source images stored in the hard drive 810, and stores the group of sub-image sets in the intermediate memory 806. The processor then performs the steps 1710 and 1714, and tests whether the stop condition of the step 1718 is met. The step 1722 is performed by the processor 805, which thereafter, although this is not shown explicitly in FIG. 14, can display the presentation selected in the step 1722 on the video display 814. The steps 1726–1734 are also performed by the processor 805.

In order to use the genetic optimisation process, an encoding scheme is needed in order to represent the sub-image sets (the genes), and the candidate presentations (the chromosomes) in an appropriate format.

Figure 15A:
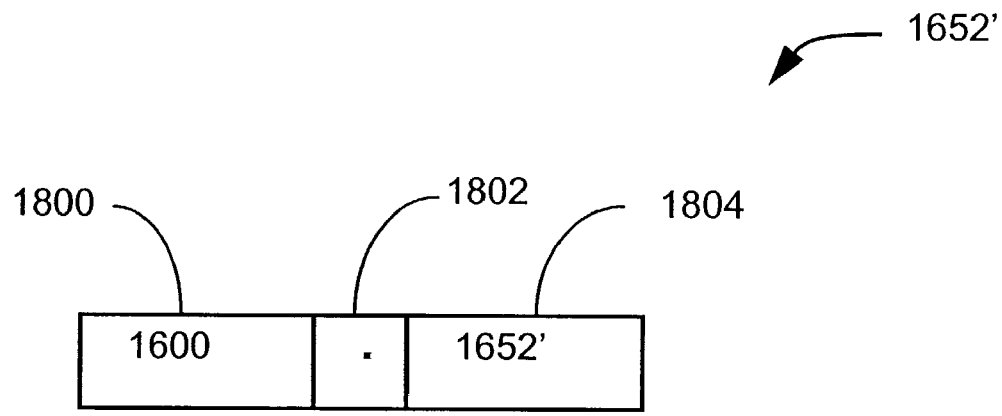
FIGS. 15A and 15B respectively show "gene" and associated "chromosome" encoding arrangements used when applying a genetic optimisation process.
Figure 15B:
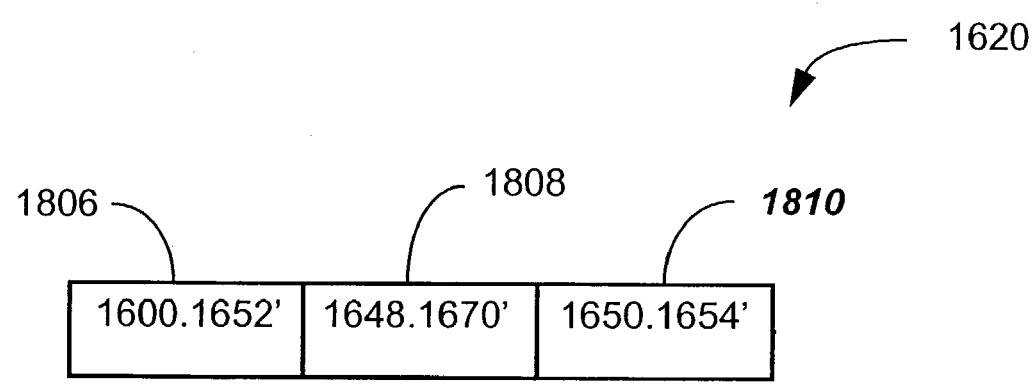

FIGS. 15A and 15B respectively show a gene encoding scheme, and an associated chromosome structure arrangement that are used to represent a sub-image set, and a candidate presentation of which the sub-image set forms a component. This representation facilitates use of the genetic optimisation process as described. The gene encoding scheme in FIG. 15A shows how the sub-image set 1652', being a member (ie a gene) of the candidate presentation 1620 (ie a chromosome), is encoded using a three part representation. The three part representation comprises the image number 1800 from which the sub-image set 1652' is derived, a decimal point 1802, and the sub-image set number 1804.

Each of the sub-image sets 1652', 1670', 1654', . . . , in the candidate presentation 1620 is similarly encoded as a three part representation, resulting in the chromosome encoding arrangement shown in FIG. 15B for the candidate presentation (ie the chromosome) 1620. In this manner, each candidate presentation 1620 is represented by a linear sequence of genetically encoded sub-image set representations 1806, 1808, . . . , 1810 in three part form as shown in FIG. 15B. This is used in FIG. 16 to illustrate reproduction using crossover. The same encoding scheme is equally valid for key slots and non-key slots.

Figure 16:
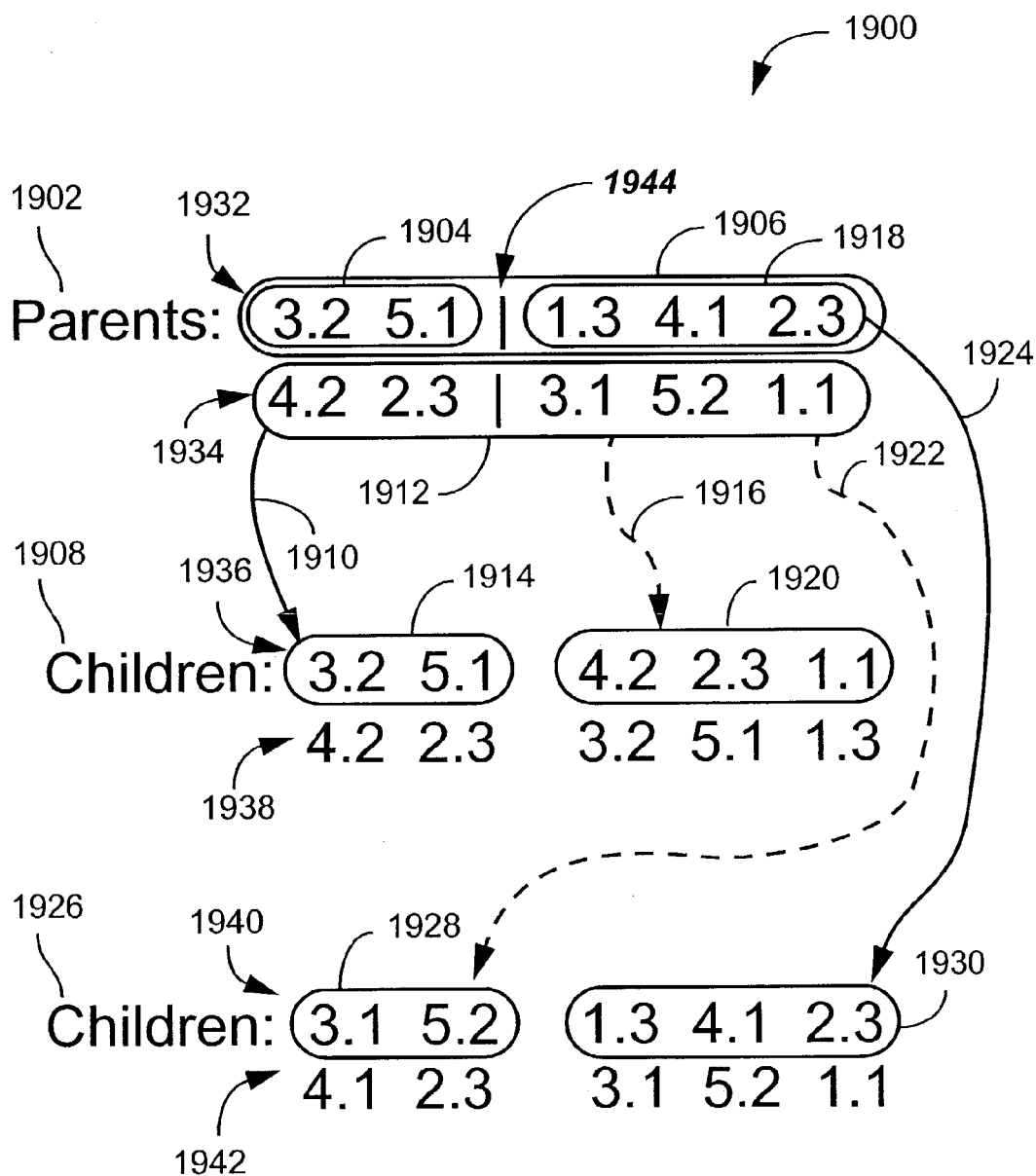
FIG. 16 shows crossover mechanisms for producing offspring from parent chromosomes.

FIG. 16 shows exemplary crossover mechanisms 1900 by which a pair of parents 1902, consisting of a parent 1932 and a parent 1934, produce a pair of children 1908 by preserving a first part 1904 of the parent 1932. The pair of parents 1902 alternately produce a pair of children 1926 by preserving a second part 1918 of the parent 1932. The first pair of children 1908 consists of a first child 1936 and a second child 1938. The second pair of children 1926 consists of a first child 1940 and a second child 1942.

Each parent 1932, 1934 and each child 1936–1942 is depicted as a linear sequence of numbers in three-part form as described in relation to FIGS. 15. Thus the parent (candidate presentation) 1932 has a first sub-image set (gene) with an encoded value of 3.2. This indicated that this first presented sub-image set consists of a sub-image set no. 2 that has been derived from a source image no. 3.

A vertical demarcating line exemplified by 1944 separates the first two sub-image set entries from the last three sub-image set entries for the parent 1932. Similar vertical demarcating lines are present in the other parent 1934 in FIG. 16. These vertical lines are the "crossover points" as will become clear from the following description. The crossover points may be positioned at predefined fixed positions, or at randomly chosen positions. Alternately, the crossover points may be positioned between an adjacent pair of genes having the worst SIP fitness.

In a first crossover arrangement, a crossover mechanism is used that preserves a first part 1904 (namely the genetic characteristics on the left-hand side of the crossover point) of the genetic structure of the parents. The crossover mechanism is implemented in accordance with the crossover probability. If this probability dictates that crossover is performed, then the parent presentations (chromosomes) are crossed over in order to form a new offspring (child presentation). If the crossover probability dictates that crossover is not performed in a particular instance, then the offspring are exact copies of the parents. In this arrangement, the first part 1904 of the parent 1932 is mapped, as depicted by an arrow 1910, to a respective first part 1914 of the child 1936. A second part 1920 of the child 1936 is derived, as depicted by a dashed arrow 1916, by considering the entire genetic structure 1912 of the parent 1934.

The genetic structure 1912 is considered by scanning from left to right (namely from a first genetic code "4.2" to a last genetic code "1.1"), successively selecting genetic codes whose source images have not already been used in the first part 1914 of the child 1936. Since the source image 4 of the genetic code 4.2 has not been selected in the first part 1914 of the child 1936 (only source image nos. 3 and 5 have been used), the genetic code "4.2" forms a first entry in the second part 1920 of the child 1936. Similarly, the respective source image of the genetic code 2.3 that is the second entry in the genetic structure 1912 of the parent 1934 has not been used in the first part 1914 of the child 1936, (or more generally, has not been used at any gene position to the left of the gene position being considered) and accordingly "2.3" forms a second entry in the part 1920 of the child 1936.

The respective source image no. 3 of the genetic code 3.1, which is the third genetic code entry from the left in the genetic structure 1912 of the second parent 1934, has however been used in the first entry (ie "3.2") in the first part 1914 of the child 1936. Thus the source image no. 3 has been used to form the genetic code 3.2 that is the first entry in the part 1914 of the child 1936. Although it is the second sub-image of the source image no. 3 which appears in the genetic structure "3.2", nonetheless this disqualifies the source image no. 3 from being represented in the part 1920 of the child 1936. Accordingly, the genetic code 3.1 in the genetic structure 1912 of the parent 1934 is disregarded, as is the following genetic code 5.2 in the parent 1934 for similar reasons. The source image no. 1 of the following genetic code 1.1 in the part 1912 of the parent 1934 does not appear to the left of the entry being considered, and accordingly the genetic code 1.1 forms the third entry in the part 1920 of the child 1936. A similar arrangement has been used to form the genetic structure of the child 1938, in which case the first part of the parent 1934 has been preserved.

It is noted that the above process is performed having regard to the nature of genetic code entries as being associated with key slots or non-key slots. When a genetic code is associated with a non-key slot, the above process is performed as described. When, however, a genetic code is associated with a key slot, an additional constraint is operative, namely that the genetic code for a particular code position must be drawn from the sub-image set group that is associated with that position. Thus, for example, if the first code position 3.2 (ie sub-image set no. 2 in group no. 3) in the parent 1932 represents a key slot, then the corresponding first code position in the child 1936 must also be selected from the same group no. 3. This is seen to be the case since the first code entry in the child 1936 is 3.2. If, however, the third code position 1.3 (ie sub-image set no. 3 in group no. 1) in the parent 1932 represents a key slot, then the corresponding third code position in the child 1936 must also be selected from the same group no. 1. The code entry in that position in FIG. 16 is 4.2, and this would not satisfy the key slot constraint. In such a case, all entries, scanning from left to right in the parent 1934 would be discarded until the entry 1.1.

In the alternate arrangement, it is the second part 1918 of the parent 1932 which is to be preserved, and this is indicated by a direct mapping 1924 to a second position 1930 of a child 1940. A first part 1928 of the child 1940 is formed by scanning, as depicted by a dashed arrow 1922, the entire genetic structure 1912 of the second parent 1934 from the left most entry 4.2 through to the right most entry 1.1. The same methodology is used as described in the first arrangement.

Recalling the fact that each, parent "chromosome" represents a candidate presentation, the operation of mutation involves introduction of small random changes, typically after crossover, to the genetic structure of a (child) presentation. Mutation impacts individual "genes" within the "chromosome", which in terms of the presentation means that mutation effects changes to sub-image sets in individual slots of the presentation. For non-key slots, one type of mutation involves changing a sub-image set in a particular slot for a randomly-selected sub-image set from the sub-image set groups, providing that the randomly selected sub-image set has not already been used elsewhere in the presentation in question. Another mutation method which can be used for non-key slots is to exchange the sub-image set in a particular slot with the sub-image set in another randomly selected non-key slot in the presentation in question. Turning to key-slots, one method of mutation is to change the sub-image set in a particular key-slot with a randomly selected sub-image set which is derived from the same source image as the sub-image set in the slot in question, provided that the randomly selected sub-image set has not already been used elsewhere in the presentation in question.

Returning to FIG. 13 it is noted that the sub-image sets 1652' and 1670' occupy the first and second slots in the candidate presentation 1620. The SIP fitness of this pair of sub-image sets is established, in the arrangement described in FIG. 17, by determining an overlap measure between a face in the end sub-image 2002 of the sub-image set 1652', and a face in the start sub-image 2006 in the sub-image set 1670'. Other SIP fitness measures can also be used, depending on the type of image content. Thus, for example, a SIP fitness measure could be based on colour similarity between the starting and ending sub images of adjacent sub-image sets. This form of SIP fitness measure may be suitable for presentations involving scenery.

FIG. 17 shows how an exemplary SIP fitness measure is determined in relation to a pair of adjacent sub-images 2002 and 2006 having respective faces 2004 and 2008 therein to be used in a tribute presentation. These sub-images 2002 and 2006 are a start sub-image and an end sub-image of two respective adjacent sub-image sets, and it is desired to establish the SIP fitness of the pair of sub-image sets. In practical terms, the greater the SIP fitness of the pair, the more likely they are to be slotted into adjacent positions in a candidate presentation. The sub-images 2002 and 2006 are normalised to the size that they will respectively have in the presentation 1408, and are then superimposed at 2010 to show the faces 2004 and 2008 in overlapping disposition. The faces 2004 and 2008 have respective areas $A_1$ and $A_2$. This overlapping produces an overlap area "OA" 2018. The faces 2004 and 2008 are enveloped in a bounding box 2012 that is depicted as a dashed rectangle, whose area is designated as "BBA".

The SIP fitness measure associated with the pair of sub-image sets 2002 and 2006 is defined by the following mathematical fitness function, which has one of two alternate forms depending on whether the faces 2004, 2008 overlap or not in the superimposed sub-image 2010.

$$SIP \text{ fitness} = \begin{cases} (OA)/\sum A + (1/2) & \text{if } OA > 0 \\ \sum A/((2)(BBA)) & \text{if } OA = 0 \end{cases} \quad [8]$$

where:
  SIP fitness is the SIP fitness measure of the pair of sub-image sets;
  OA is the overlap area 2018 of the faces 2004 and 2008; and
  $\Sigma A = A_1 + A_2$ In the event that the faces 2004, 2008 overlap, the range of possible SIP fitness measure is (0.5,1.0], where "(" indicates an "open" interval that excludes the value 0.5, and "]" indicates a "closed" interval including the value 1.0. If the faces 2004 and 2008 do not overlap, then the range of the SIP fitness measure is (0, 0.5]. The fitness functions used in the present description solve a maximization problem and accordingly, the larger a SIP fitness measure, the "better" it is considered to be. In practical terms, the more the faces 2004 and 2008 overlap, the "better" is the SIP fitness measure. In the non-overlapping case, the closer the two faces 2004 and 2008 approach to each other, the better is the SIP fitness measure.

As noted, a presentation fitness measure for a candidate presentation is determined on the basis of SIP fitness measures for sub-images sets of which the candidate presentation is composed. The presentation fitness measure is thus defined by the following mathematical fitness function:

$$\text{presentation fitness measure} = \sum_{m-1} (SIP \text{ fitness measures}) + G \quad [9]$$

where: the summation is performed in respect of m−1 start/end sub-image set pairs for a candidate presentation having in slots, and G represents a measure of the global fitness.

The presentation fitness measure may also have contributing components derived from the particular arrangement of the sub-image sets of a candidate presentation. For example, each sub-image set may be associated with a particular artistic effect (for example zoom-in, pan, and zoom-out as described in relation to FIG. 12). A template may be used to guide compilation of a presentation, and the template may assert that it is preferable for a particular artistic effect to only be used for a specified time fraction of the presentation. This constitutes an exemplary global measure which can be included in the presentation fitness measure.

Population fitness is the sum of the individual presentation fitnesses over the population:

$$\text{population\_fitness\_measure} = \sum_n \text{presentaion\_fitness\_measure}_n \quad [10]$$

where: presentation_fitness_measure$_n$ is the variable on the left hand side of equation [9], and the summation is performed over n presentations.

The step 1726 (see FIG. 14) that selects a pair of parent candidate presentations based on their presentation fitness can make use of normalised fitness measures for the parents, where this is calculated by using the following mathematical representation:

$$\text{normalised fitness}_i = \frac{\text{fitness}_i - \text{worstfitness}}{\sum_n (\text{fitness}_n - \text{worstfitness})} \quad [11]$$

where:
  normalised fitness$_i$ is a normalised fitness measure for a parent presentation no i;
  worstfitness is the worst presentation fitness measure in the population;
  fitness$_i$ is the fitness of the parent presentation no i being considered; and
  the summation is performed over n candidate presentations in the population.

Figure 18:
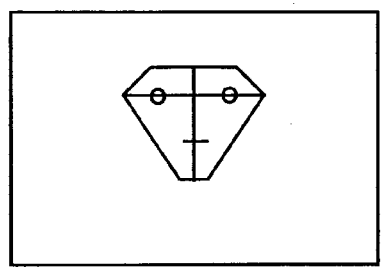
FIG. 18 depicts exemplary face group classifications.
Figure 18:
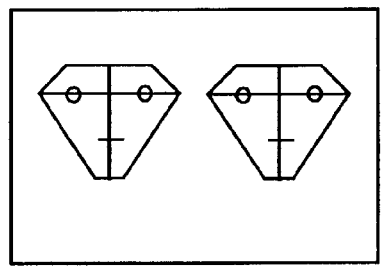
Figure 18:
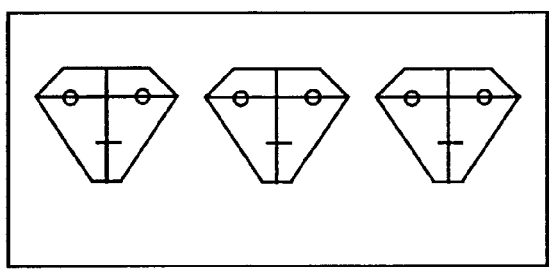
Figure 18:
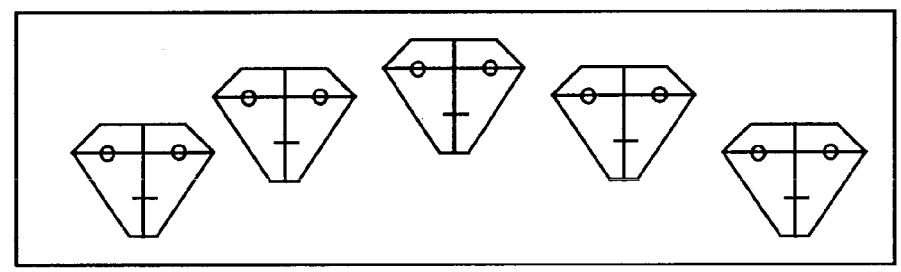
Figure 18:
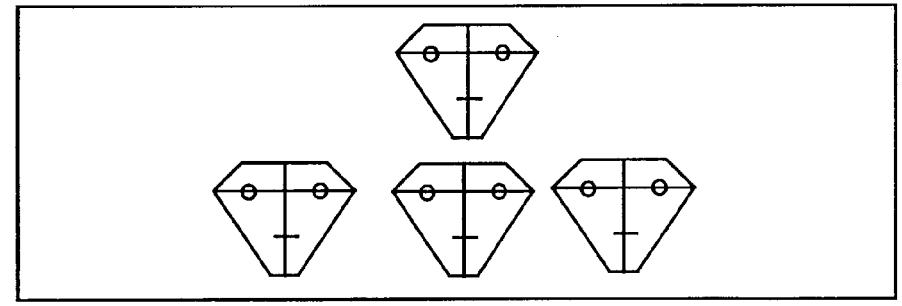
Figure 18:
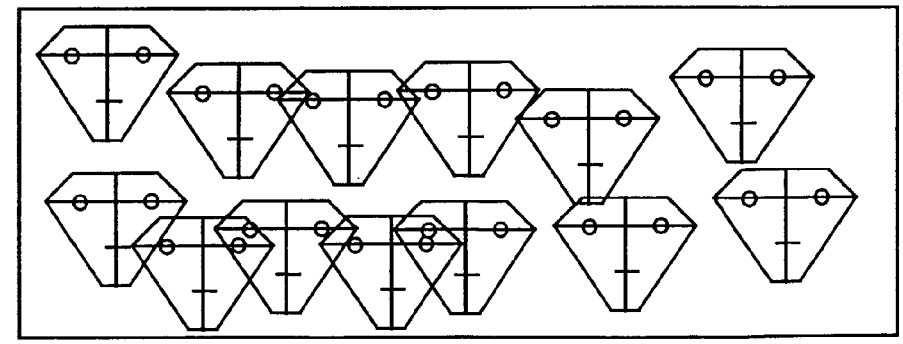

FIG. 18 shows presentations of face groups having single, two, trio, lineup, pyramid and stack arrangements depicted at A to F respectively.

Figure 19:
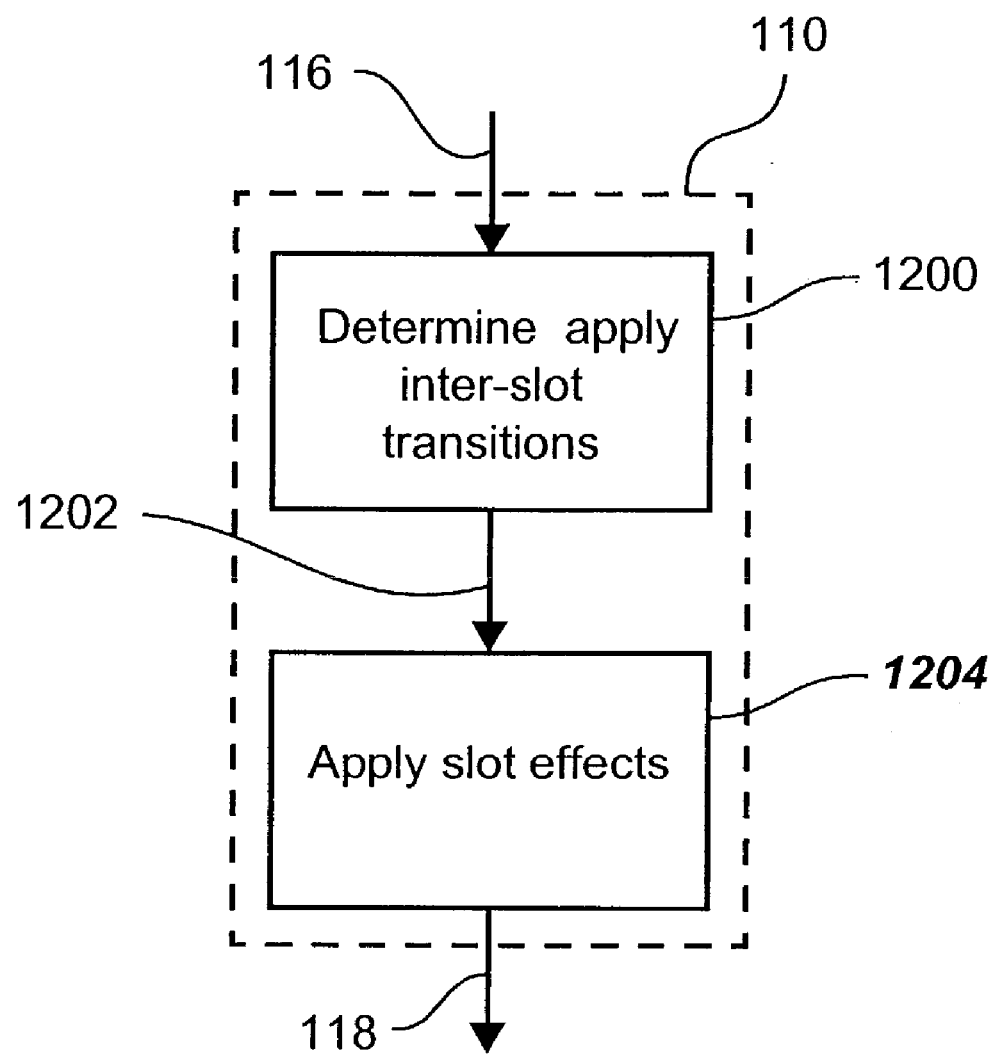
FIG. 19 shows a flow chart for applying effects and transitions to sub-images in the presentation.

FIG. 19 shows the process 110 for applying inter-slot transitions and slot effects between sub-image sets that have been selected and ordered by the step 108 in FIG. 4. The process 110 commences with a step 1200 that determines inter-slot transitions that are to be applied. The following transition rule extract from the template in Appendix A determines the transitions to be used between successive end and start sub-images in adjacent slots.

```
<transitionRule>
    <pattern>
        <all/>
    </pattern>                                    [12]
    <action>
        <transition>crossFade</transition>
        <duration>PT2S</duration>
    </action>
</transitionRule>
``` where [12] imposes the same transition, being a cross-fade, between all respective end and start sub-images between adjacent slots in the presentation.

After the inter-slot transitions have been applied in accordance with the step 1200, the process 110 is directed in accordance with an arrow 1202 to a step 1204 which applies slot effects. The template in Appendix A defines the spatial connection rules separately from the effects rules, however the effects rules explicitly reference the spatial rules, and the two types of rules are thus coupled. It will be recalled that the spatial connection rules derive the sub-image sets from the source images, whereas the effects rules "link" the sub-images in the sub-image sets together using various effects.

The following extracts [13] and [14] from the template in Appendix A illustrate "coupled" spatial and effects rules. The following fragment [13] defines an exemplary spatial connection rule for "couple" face groups:

```
<spatialConnectionRule>
    <pattern>
        <faceGroup>couple</faceGroup>
    </pattern>
    <action>
        <cropSpec>
            <startSubImage                                    [13]
  numberOfFaces="2">mediumShot</StartSubImage>
            <endSubImage
  numberOfFaces="2">mediumCloseUp</endSubImage>
        </cropSpec>
    </action>
</spatialConnectionRule>
```

The extract [13] provides a spatial connection rule whereby (i) a "couple" face group is defined by cropping the associated source image to provide a medium shot (MS as defined in Appendix C) for the start sub-image, and (ii) the source image is cropped to provide a medium close-up (MCU as defined in Appendix C) to provide the end sub-image of the sub-image set. Accordingly, this spatial connection rule produces a sub-image set for a couple face group which has only a start and an end sub-image. The following fragment [14] defines an exemplary effect rule for the "couple" face group:

```
<effectRule>
    <pattern>
        <faceGroup>couple</faceGroup>
    </pattern>
    <action>
        <effect>                                              [14]
            <duration>PT2S</duration>
            <type>zoomIn</type>
        </effect>
    </action>
</effectRule>
```

The effect rule [14] is associated with the previous spatial connection rule [13] and imposes a 2 second duration on the sub-image set, and imposes a zoom-in effect between the start sub-image and the end sub-image. It is thus seen that each spatial connection rule has an associated effect rule, and that although these rules are provided in different parts of the template, they are nonetheless coupled and the spatial connection rule determines the associated effect to be applied.

INDUSTRIAL APPLICABILITY

It is apparent from the above that the arrangements described are applicable to the image processing industries.

The foregoing describes only some embodiments of the present invention, and modifications and/or changes can be made thereto without departing from the scope and spirit of the invention, the embodiment(s) being illustrative and not restrictive.

Thus, for example, one or more of the steps of the preferred method(s) may be performed in parallel rather sequentially as depicted in FIG. 5.

Furthermore, although the description has been directed to image presentations, the disclosed method can be equally applied to other media items. When applied to video clips, a plurality of start/end video-clip pairs (referred to as SVPs, and being analogous to the SIPs defined for images) can be formed from a source video clip. An exemplary SVP can comprise respective first and last frames in the video clip. In this arrangement, the described techniques used for images in the description can be used directly for video. An SVP fitness function can be identical to the SIP fitness function based upon fitness of an adjacent pair of SVPs in a manner similar to that described in relation to FIG. 17 and Equation [8].

When applied to audio clips, a plurality of start/end audio-clip pairs (referred to as SAPs, being analogous to the SIPs defined for images) can be formed from a source audio clip. An exemplary SAP can comprise respective first and last segments in the audio clip. In this arrangement, the described techniques used for images in the description can be used with some modification for audio. A SAP fitness function can be based upon fitness of an adjacent pair of SAPs, and can utilize a modified version of Equation [8]. The modified equation can be based, for example, upon comparison of audio metrics such as loudness or tempo in the adjacent pair of SAPs. A corresponding fitness function would, for example, solve a maximization problem and accordingly, the larger a SAP fitness measure, the "better" it is considered to be. In practical terms, the closer the match between volumes (or tempos) of adjacent SAPs, the "better" is the SAP fitness measure. For all media types to which the disclosed arrangements can be applied, it will be apparent that the resulting presentation forms a preview or short summary of the selected source content. This functionality is particularly advantageous for time-sequential media such as video and audio where it is time consuming to view/listen to the source material in its entirety. The selection and definition of SVPs and SAPs can be performed in order to place particular emphasis on parts of the target media content that are perceived to be memorable or important to the viewer or listener. For example, the opening segments of audio clips are typically perceived to be of particular interest.

Appendix A

An Exemplary Image Presentation Template

```xml
<?xml version="1.0"?>
<!-- (C) Copyright Canon Information Systems Research Australia (CISRA) 2000 -->
<!-- All rights reserved -->
<ip:presenterTemplate xmlns:ip="http://www.cisra.com.au/ImagePresenter"
xmlns:xlink="http://www.w3.org/1999/xlink"
xmlns:xsi="http://www.w3.org/2001/XMLSchema-instance"
xsi:schemaLocation="http://www.cisra.com/ImagePresenter PresentationTemplate.xsd">
        <presentationType>StandardTribute</presentationType>
        <requiredMetadata>
                <imageWidth/>
                <ImageHeight/>
                <faceGroup>
                        <choice>single couple trio pyramid lineUp stack</choice>
                </faceGroup>
                <face>
                        <rectangle>
                                <sequence>x0 y0 width height</sequence>
                        </rectangle>
                        <eyeCenter>
                                <sequence>x0 y0</sequence>
                        </eyeCenter>
                </face>
        </requiredMetadata>
        <avgSlotDuration>PT3S</avgSlotDuration>
        <primaryOrder method="other">
                <fitnessFunction
xlink:href="http//../ImagePresenter/fitnessFunction.class">javaClass</fitnessFunction>
        </primaryOrder>
        <keySlot>
                <slotPosition>first</slotPosition>
                <properties>
                        <quality>high</quality>
                        <faceGroup>single</faceGroup>
                        <contrast>high</contrast>
                        <effect>
                                <duration>PT2S</duration>
                                <type>zoomIn</type>
                        </effect>
                </properties>
        </keySlot>
        <keySlot>
                <slotPosition>last</slotPosition>
                <properties>
                        <quality>high</quality>
                        <faceGroup>stack</faceGroup>
                        <contrast>high</contrast>
                        <effect>
                                <duration>PT2S</duration>
                                <type>zoomOut</type>
                        </effect>
                </properties>
```

```xml
</keySlot>
<spatialConnectionRule>
    <pattern>
        <eyeCenter/>
    </pattern>
    <action>
        <cropTo unit="fraction">
            <top>0.1</top>
            <bottom>0.5</bottom>
            <Left>0.1</Left>
            <Right>0.1</Right>
        </cropTo>
    </action>
</spatialConnectionRule>
<spatialConnectionRule>
    <pattern>
        <faceGroup>single</faceGroup>
    </pattern>
    <action>
        <cropSpec>
            <startSubImage numberOfFaces="1">mediumShot</startSubImage>
            <endSubImage numberOfFaces="1">mediumCloseUp</endSubImage>
        </cropSpec>
    </action>
</spatialConnectionRule>
<spatialConnectionRule>
    <pattern>
        <faceGroup>couple</faceGroup>
    </pattern>
    <action>
        <cropSpec>
            <startSubImage numberOfFaces="2">mediumShot</startSubImage>
            <endSubImage numberOfFaces="2">mediumCloseUp</endSubImage>
        </cropSpec>
    </action>
</spatialConnectionRule>
<spatialConnectionRule>
    <pattern>
        <faceGroup>trio</faceGroup>
    </pattern>
    <action>
        <cropSpec>
            <startSubImage numberOfFaces="1">mediumCloseUp</startSubImage>
            <endSubImage numberOfFaces="1">mediumCloseUp</endSubImage>
        </cropSpec>
        <cropSpec>
            <startSubImage numberOfFaces="1">mediumCloseUp</startSubImage>
```

```xml
            <endSubImage
numberOfFaces="2">mediumCloseUp</endSubImage>
        </cropSpec>
        <cropSpec>
            <startSubImage
numberOfFaces="2">mediumCloseUp</startSubImage>
            <endSubImage
numberOfFaces="1">mediumCloseUp</endSubImage>
        </cropSpec>
    </action>
</spatialConnectionRule>
<spatialConnectionRule>
    <pattern>
        <faceGroup>pyramid</faceGroup>
    </pattern>
    <action>
        <cropSpec>
            <startSubImage>mediumCloseUp</startSubImage>
            <endSubImage>mediumCloseUp</endSubImage>
        </cropSpec>
    </action>
</spatialConnectionRule>
<spatialConnectionRule>
    <pattern>
        <faceGroup>lineUp</faceGroup>
    </pattern>
    <action>
        <cropSpec>
            <startSubImage
numberOfFaces="1">mediumCloseUp</startSubImage>
            <endSubImage
numberOfFaces="1">mediumCloseUp</endSubImage>
        </cropSpec>
        <cropSpec>
            <startSubImage
numberOfFaces="1">mediumCloseUp</startSubImage>
            <endSubImage
numberOfFaces="2">mediumCloseUp</endSubImage>
        </cropSpec>
        <cropSpec>
            <startSubImage
numberOfFaces="2">mediumCloseUp</startSubImage>
            <endSubImage
numberOfFaces="1">mediumCloseUp</endSubImage>
        </cropSpec>
        <cropSpec>
            <startSubImage
numberOfFaces="2">mediumCloseUp</startSubImage>
            <endSubImage
numberOfFaces="2">mediumCloseUp</endSubImage>
        </cropSpec>
    </action>
</spatialConnectionRule>
<spatialConnectionRule>
    <pattern>
```

```xml
            <faceGroup>stack</faceGroup>
        </pattern>
        <action>
            <cropSpec>
                <startSubImage>mediumShot</startSubImage>
                <endSubImage>mediumCloseUp</endSubImage>
            </cropSpec>
        </action>
</spatialConnectionRule>
<temporalConnectionRule>
        <pattern>
            <effect>pan</effect>
        </pattern>
        <action>
            <fraction>0.3</fraction>
            <distribution>even</distribution>
        </action>
</temporalConnectionRule>
<temporalConnectionRule>
        <pattern>
            <effect>tilt</effect>
        </pattern>
        <action>
            <fraction>0.1</fraction>
            <distribution>even</distribution>
        </action>
</temporalConnectionRule>
<temporalConnectionRule>
        <pattern>
            <effect>zoomIn</effect>
        </pattern>
        <action>
            <fraction>0.5</fraction>
            <distribution>even</distribution>
        </action>
</temporalConnectionRule>
<temporalConnectionRule>
        <pattern>
            <effect>zoomOut</effect>
        </pattern>
        <action>
            <fraction>0.1</fraction>
            <distribution>even</distribution>
        </action>
</temporalConnectionRule>
<effectRule>
        <pattern>
            <faceGroup>single</faceGroup>
        </pattern>
        <action>
            <effect>
                <duration>PT2S</duration>
                <type>zoomIn</type>
            </effect>
        </action>
```

```
</effectRule>
<effectRule>
    <pattern>
        <faceGroup>couple</faceGroup>
    </pattern>
    <action>
        <effect>
            <duration>PT2S</duration>
            <type>zoomIn</type>
        </effect>
    </action>
</effectRule>
<effectRule>
    <pattern>
        <faceGroup>trio</faceGroup>
    </pattern>
    <action>
        <effect>
            <duration>PT2S</duration>
            <type>zoomOut</type>
        </effect>
        <effect>
            <duration>PT2S</duration>
            <type>panRight</type>
        </effect>
        <effect>
            <duration>PT2S</duration>
            <type>zoomIn</type>
        </effect>
    </action>
</effectRule>
<effectRule>
    <pattern>
        <faceGroup>pyramid</faceGroup>
    </pattern>
    <action>
        <effect>
            <duration>PT2S</duration>
            <type>zoomOut</type>
        </effect>
        <effect>
            <duration>PT2S</duration>
            <type>tiltUp</type>
        </effect>
        <effect>
            <duration>PT2S</duration>
            <type>zoomIn</type>
        </effect>
    </action>
</effectRule>
<effectRule>
    <pattern>
        <faceGroup>lineUp</faceGroup>
    </pattern>
    <action>
```

```xml
        <effect>
                <duration>PT2S</duration>
                <type>zoomOut</type>
        </effect>
        <effect>
                <duration>PT4S</duration>
                <type>panRight</type>
        </effect>
        <effect>
                <duration>PT2S</duration>
                <type>zoomIn</type>
        </effect>
    </action>
</effectRule>
<effectRule>
    <pattern>
        <faceGroup>stack</faceGroup>
    </pattern>
    <action>
        <effect>
                <duration>PT2S</duration>
                <type>zoomIn</type>
        </effect>
    </action>
</effectRule>
<transitionRule>
    <pattern>
        <all/>
    </pattern>
    <action>
        <transition>crossFade</transition>
        <duration>PT2S</duration>
    </action>
</transitionRule>
</ip:presenterTemplate>
```

Appendix B

An Exemplary XML Schema for Image Presenter Templates

```xml
<?xml version="1.0" encoding="UTF-8"?>
<!--W3C Schema generated by XML Spy v4.0.1 (http://www.xmlspy.com)-->
<xs:schema xmlns:xs="http://www.w3.org/2001/XMLSchema"
xmlns:ip="http://www.cisra.com.au/ImagePresenter"
xmlns:xlink="http://www.w3.org/1999/xlink"
targetNamespace="http://www.cisra.com.au/ImagePresenter"
elementFormDefault="unqualified">
    <xs:element name="presenterTemplate">
        <xs:complexType>
            <xs:sequence>
                <xs:element name="presentationType" type="xs:string"/>
                <xs:element name="requiredMetadata">
                    <xs:complexType>
                        <xs:sequence>
                            <xs:element name="imageWidth"/>
                            <xs:element name="ImageHeight"/>
                            <xs:element name="faceGroup">
                                <xs:complexType>
                                    <xs:sequence>
                                        <xs:element name="choice" type="ip:faceGroupList"/>
                                    </xs:sequence>
                                </xs:complexType>
                            </xs:element>
                            <xs:element name="face" type="ip:face"/>
                        </xs:sequence>
                    </xs:complexType>
                </xs:element>
                <xs:element name="avgSlotDuration" type="xs:duration"/>
                <xs:element name="primaryOrder">
                    <xs:complexType>
                        <xs:sequence>
                            <xs:element name="fitnessFunction" minOccurs="0">
                                <xs:complexType>
                                    <xs:simpleContent>
                                        <xs:extension base="ip:codeType">
                                            <xs:attribute ref="xlink:href"/>
                                        </xs:extension>
                                    </xs:simpleContent>
                                </xs:complexType>
                            </xs:element>
                        </xs:sequence>
                        <!--Image ordering methed: choice of the following -->
                        <xs:attribute name="method">
                            <xs:simpleType>
                                <xs:restriction base="xs:string">
                                    <xs:enumeration value="chronologic"/>
```

```xml
                                                <xs:enumeration value="selectionOrder"/>
                                                <xs:enumeration value="other"/>
                                            </xs:restriction>
                                        </xs:simpleType>
                                    </xs:attribute>
                                </xs:complexType>
                            </xs:element>
                            <xs:element name="keySlot" type="ip:keySlot" maxOccurs="unbounded"/>
                            <xs:element name="spatialConnectionRule" type="ip:spatialConnectionRule" maxOccurs="unbounded"/>
                            <xs:element name="temporalConnectionRule" type="ip:temporalConnectionRule" maxOccurs="unbounded"/>
                            <xs:element name="effectRule" type="ip:effectRule" maxOccurs="unbounded"/>
                            <xs:element name="transitionRule" type="ip:transitionRule" maxOccurs="unbounded"/>
                        </xs:sequence>
                    </xs:complexType>
                </xs:element>
                <xs:complexType name="startAndEnd">
                    <xs:simpleContent>
                        <xs:extension base="ip:imageType">
                            <xs:attribute name="numberOfFaces" type="xs:positiveInteger"/>
                        </xs:extension>
                    </xs:simpleContent>
                </xs:complexType>
                <xs:complexType name="face">
                    <xs:sequence>
                        <xs:element name="rectangle">
                            <xs:complexType>
                                <xs:sequence>
                                    <xs:element name="sequence">
                                        <xs:simpleType>
                                            <xs:list itemType="xs:string"/>
                                        </xs:simpleType>
                                    </xs:element>
                                </xs:sequence>
                            </xs:complexType>
                        </xs:element>
                        <xs:element name="eyeCenter">
                            <xs:complexType>
                                <xs:sequence>
                                    <xs:element name="sequence">
                                        <xs:simpleType>
                                            <xs:list itemType="xs:string"/>
                                        </xs:simpleType>
                                    </xs:element>
                                </xs:sequence>
                            </xs:complexType>
                        </xs:element>
                    </xs:sequence>
                </xs:complexType>
                <xs:complexType name="keySlot">
```

```xml
<xs:sequence>
    <xs:element name="slotPosition">
        <xs:simpleType>
            <xs:union>
                <xs:simpleType>
                    <xs:restriction base="xs:string">
                        <xs:enumeration value="first"/>
                        <xs:enumeration value="middle"/>
                        <xs:enumeration value="last"/>
                    </xs:restriction>
                </xs:simpleType>
                <xs:simpleType>
                    <xs:restriction base="xs:integer">
                        <xs:minInclusive value="1"/>
                    </xs:restriction>
                </xs:simpleType>
            </xs:union>
        </xs:simpleType>
    </xs:element>
    <xs:element name="properties">
        <xs:complexType>
            <xs:sequence>
                <xs:element name="quality" type="ip:level"/>
                <xs:element name="faceGroup" type="ip:faceGroup"/>
                <xs:element name="contrast" type="ip:level"/>
                <xs:element name="effect" type="ip:effect"/>
            </xs:sequence>
        </xs:complexType>
    </xs:element>
</xs:sequence>
</xs:complexType>
<xs:complexType name="spatialConnectionRule">
    <xs:sequence>
        <xs:element name="pattern">
            <xs:complexType>
                <xs:choice>
                    <xs:element name="eyeCenter"/>
                    <xs:element name="faceGroup" type="ip:faceGroup"/>
                </xs:choice>
            </xs:complexType>
        </xs:element>
        <xs:element name="action">
            <xs:complexType>
                <xs:choice>
                    <xs:element name="cropTo">
                        <xs:complexType>
                            <xs:sequence>
                                <xs:element name="top" type="xs:float"/>
                                <xs:element name="bottom" type="xs:float"/>
                                <xs:element name="Left" type="xs:float"/>
```

```xml
                                        <xs:element name="Right"
type="xs:float"/>
                                        </xs:sequence>
                                        <xs:attribute name="unit"
type="xs:string"/>
                                </xs:complexType>
                        </xs:element>
                        <xs:element name="cropSpec"
maxOccurs="unbounded">
                                <xs:complexType>
                                        <xs:sequence>
                                                <xs:element name="startSubImage"
type="ip:startAndEnd"/>
                                                <xs:element name="endSubImage"
type="ip:startAndEnd"/>
                                        </xs:sequence>
                                </xs:complexType>
                        </xs:element>
                     </xs:choice>
                </xs:complexType>
           </xs:element>
       </xs:sequence>
</xs:complexType>
<xs:complexType name="temporalConnectionRule">
       <xs:sequence>
           <xs:element name="pattern">
                <xs:complexType>
                     <xs:sequence>
                          <xs:element name="effect" type="ip:effectType"/>
                     </xs:sequence>
                </xs:complexType>
           </xs:element>
           <xs:element name="action">
                <xs:complexType>
                     <xs:sequence>
                          <xs:element name="fraction" type="xs:float"/>
                          <xs:element name="distribution">
                               <xs:simpleType>
                                    <xs:restriction base="xs:string">
                                         <xs:enumeration value="even"/>
                                         <xs:enumeration
value="weightedAtStart"/>
                                         <xs:enumeration
value="weightedAtMiddle"/>
                                         <xs:enumeration
value="weightedAtEnd"/>
                                    </xs:restriction>
                               </xs:simpleType>
                          </xs:element>
                     </xs:sequence>
                </xs:complexType>
           </xs:element>
       </xs:sequence>
</xs:complexType>
<xs:complexType name="effectRule">
```

```xml
<xs:sequence>
    <xs:element name="pattern">
        <xs:complexType>
            <xs:sequence>
                <xs:element name="faceGroup" type="ip:faceGroup"/>
            </xs:sequence>
        </xs:complexType>
    </xs:element>
    <xs:element name="action">
        <xs:complexType>
            <xs:sequence>
                <xs:element name="effect" type="ip:effect" maxOccurs="unbounded"/>
            </xs:sequence>
        </xs:complexType>
    </xs:element>
</xs:sequence>
</xs:complexType>
<xs:complexType name="effect">
    <xs:sequence>
        <xs:element name="duration" type="xs:duration"/>
        <xs:element name="type" type="ip:effectType"/>
    </xs:sequence>
</xs:complexType>
<xs:complexType name="transitionRule">
    <xs:sequence>
        <xs:element name="pattern">
            <xs:complexType>
                <xs:choice>
                    <xs:element name="all"/>
                    <xs:element name="keySlot"/>
                    <xs:element name="nonKeySlot"/>
                </xs:choice>
            </xs:complexType>
        </xs:element>
        <xs:element name="action">
            <xs:complexType>
                <xs:sequence>
                    <xs:element name="transition" type="ip:transitions"/>
                    <xs:element name="duration" type="xs:duration"/>
                </xs:sequence>
            </xs:complexType>
        </xs:element>
    </xs:sequence>
</xs:complexType>
<xs:simpleType name="faceGroupList">
    <xs:list itemType="ip:faceGroup"/>
</xs:simpleType>
<xs:simpleType name="faceGroup">
    <xs:restriction base="xs:string">
        <xs:enumeration value="single"/>
        <xs:enumeration value="couple"/>
        <xs:enumeration value="trio"/>
        <xs:enumeration value="pyramid"/>
```

```
                <xs:enumeration value="lineUp"/>
                <xs:enumeration value="stack"/>
            </xs:restriction>
    </xs:simpleType>
    <xs:simpleType name="level">
            <xs:restriction base="xs:string">
                <xs:enumeration value="high"/>
                <xs:enumeration value="median"/>
                <xs:enumeration value="low"/>
            </xs:restriction>
    </xs:simpleType>
    <xs:simpleType name="effectType">
            <xs:restriction base="xs:string">
                <xs:enumeration value="zoomIn"/>
                <xs:enumeration value="zoomOut"/>
                <xs:enumeration value="pan"/>
                <xs:enumeration value="panRight"/>
                <xs:enumeration value="panLeft"/>
                <xs:enumeration value="tilt"/>
                <xs:enumeration value="tiltUp"/>
            </xs:restriction>
    </xs:simpleType>
    <xs:simpleType name="transitions">
            <xs:restriction base="xs:string">
                <xs:enumeration value="crossFade"/>
                <xs:enumeration value="fadeToBalck"/>
                <xs:enumeration value="fadeToWhite"/>
                <xs:enumeration value="none"/>
            </xs:restriction>
    </xs:simpleType>
    <xs:simpleType name="imageType">
            <xs:restriction base="xs:string">
                <xs:enumeration value="extremeCloseUp"/>
                <xs:enumeration value="closeUp"/>
                <xs:enumeration value="mediumCloseUp"/>
                <xs:enumeration value="mediumShot"/>
                <xs:enumeration value="longShot"/>
                <xs:enumeration value="extremeLong"/>
            </xs:restriction>
    </xs:simpleType>
    <xs:simpleType name="codeType">
            <xs:restriction base="xs:string">
                <xs:enumeration value="javaClass"/>
                <xs:enumeration value="c++Class"/>
            </xs:restriction>
    </xs:simpleType>
</xs:schema>
```

Appendix C

An Image Classification Scheme, and Terminology Used Therein

"Extreme long shots" (ELS), are useful for establishing characters within their environment, and also for orientating an audience to the particular location considered. "Long shots" (LS) are also useful in the same regard. In some instances, an ELS is considered more dramatic than an LS.

A "medium long shot" (MLS) places the characters closer to the viewer than the previous long shots, and indicates, in a transition from a long shot, subjects as being of importance to a story. An MLS typically views a human subject from the knees upwards.

A "medium shot" (MS) generally shows human characters from the waist upwards, and these shots assist a viewer in interpreting the character's reaction to their environment, as well as any particular dialogue that has taken place.

The "Medium Close Up" (MCU) is useful for dialogue and communication interpretation, including the emotion of the characters in the image. "Close-up" (CU) shots frame the forehead and shoulders of human characters within the shot, and are useful for achieving a clear understanding of the emotions at play in the particular image. CU shots are used to consciously place the audience in the position of the character being imaged, in order to achieve a greater dramatic effect. "Extreme close-up shots" (ECU) are very tight shots of a portion of a face in an image, and demonstrate, in a manner that extends beyond the dialogue, the full dramatic effect of an emotion. An ECU can be jarring or threatening to the audience in some cases, and is often used in thriller or horror movies.

The various shots can be roughly classified in terms of the percentage of the total image taken up by the subject, being a face or some other identifiable image structure. Typical rules for defining the various shots are (i) MLS – subject less than 2.5% of the image, (ii) MS – subject fills between 2.5 and 10% of the image, (iii) MCU – subject fills from 10 to 30% of the image, (iv) CU – subject fills from 30 to 80% of the image, and (v) ECU – subject fills more than 80% of the image.

Appendix D

Exemplary Image Metadata (using XML)

```
<?xml version="1.0"?>
<!-- (C) Copyright Canon Information Systems Research Australia (CISRA) 2000 -->
<!-- All rights reserved -->
<md:imageMetadata xmlns:md="http://www.cisra.com/ImagePresenter"
        xmlns:xsi="http://www.w3.org/2001/XMLSchema-instance"
        xsi:schemaLocation="http://www.cisra.com/ImagePresenter ImageMetadata.xsd"
        xmlns:xlink="http://www.w3.org/1999/xlink"
        xlink:href="http://www.cisra.com/ImagePresenter/images/family.jpg">

<imageWidth>832</imageWidth>
    <imageHeight>624</imageHeight>
    <faceGroup>couple</faceGroup>
    <face id="Face1">
        <rectangle>
            <x0>30</x0>
            <y0>252</y0>
            <width>108</width>
            <height>12</height>
        </rectangle>
        <eyeCenter position="left">
            <x0>69</x0>
            <y0>306</y0>
        </eyeCenter>
        <eyeCenter position="right">
            <x0>114</x0>
            <y0>303</y0>
        </eyeCenter>
    </face>
    <face id="Face2">
        <rectangle>
            <x0>624</x0>
            <y0>234</y0>
            <width>105</width>
            <height>123</height>
        </rectangle>
        <eyeCenter position="left">
            <x0>633</x0>
            <y0>285</y0>
        </eyeCenter>
        <eyeCenter position="right">
            <x0>675</x0>
            <y0>288</y0>
        </eyeCenter>
    </face>
</md:imageMetadata>
```

Appendix E

An Exemplary XML Schema for Image Metadata

```xml
<?xml version="1.0" encoding="UTF-8"?>
<!-- (C) Copyright Canon Information Systems Research Australia (CISRA) 2000 -->
<!-- All rights reserved -->
<xs:schema xmlns:xs="http://www.w3.org/2001/XMLSchema"
      xmlns:md="http://www.cisra.com/ImagePresenter"
      xmlns:xlink="http://www.w3.org/1999/xlink"
      targetNamespace="http://www.cisra.com/ImagePresenter"
      elementFormDefault="unqualified">

<xs:element name="imageMetadata">
        <xs:complexType>
            <xs:sequence>
                <xs:element name="imageWidth" type="xs:positiveInteger"/>
                <xs:element name="imageHeight" type="xs:positiveInteger"/>
                <xs:element name="faceGroup" type="md:faceGroup"/>
                <xs:element name="face" type="md:face" maxOccurs="unbounded"/>
            </xs:sequence>
            <xs:attribute ref="xlink:href"/>
        </xs:complexType>
    </xs:element>
    <xs:complexType name="face">
        <xs:sequence>
            <xs:element name="rectangle" type="md:rectangle" maxOccurs="unbounded"/>
            <xs:element name="eyeCenter" type="md:eyeCenter" maxOccurs="2"/>
        </xs:sequence>
        <xs:attribute name="id" type="xs:ID" use="required"/>
    </xs:complexType>
    <xs:complexType name="rectangle">
        <xs:sequence>
            <xs:element name="x0" type="xs:positiveInteger"/>
            <xs:element name="y0" type="xs:positiveInteger"/>
            <xs:element name="width" type="xs:positiveInteger"/>
            <xs:element name="height" type="xs:positiveInteger"/>
        </xs:sequence>
    </xs:complexType>
    <xs:complexType name="eyeCenter">
        <xs:sequence>
            <xs:element name="x0" type="xs:positiveInteger"/>
            <xs:element name="y0" type="xs:positiveInteger"/>
        </xs:sequence>
        <xs:attribute name="position" type="md:position" use="required"/>
    </xs:complexType>
    <xs:simpleType name="position">
        <xs:restriction base="xs:string">
            <xs:enumeration value="left"/>
            <xs:enumeration value="right"/>
        </xs:restriction>
    </xs:simpleType>
```

```
<xs:simpleType name="faceGroup">
    <xs:restriction base="xs:string">
        <xs:enumeration value="single"/>
        <xs:enumeration value="couple"/>
        <xs:enumeration value="trio"/>
        <xs:enumeration value="pyramid"/>
        <xs:enumeration value="lineup"/>
        <xs:enumeration value="stack"/>
    </xs:restriction>
</xs:simpleType>
</xs:schema>
```

The invention claimed is:

1. A method of producing an image presentation from a set of source images, the method comprising the steps of:
defining a multi-slot presentation skeleton comprising a predetermined number of slots into which images are to be inserted, the number of slots being dependent upon a predetermined duration of the presentation;
establishing durations and locations of key slots and durations and locations of non-key slots in the skeleton;
generating candidate groups of sub-image sets from corresponding source images in the set of source images;
inserting, into each said key slot, one sub-image set from the candidate groups;
placing, into each said non-key slot, one sub-image set from the candidate groups; and
processing the sub-image sets in the skeleton slots using effect and transition rules, to thereby form the image presentation to be displayed.

2. A method according to claim 1 wherein the generating step comprises the steps of:
classification of the source images into groups; and
performing, using spatial connection rules, at least one of cropping and sizing of each source image to thereby generate a corresponding sub-image set.

3. A method according to claim 1, wherein prior to the inserting step, the method further comprises the steps of:
(a) selecting a number of candidate groups equal to the number of said key slots;
(b) choosing, from each of the selected candidate groups, a sub-image set for insertion into a corresponding key slot; and wherein:
the placing step comprises, for a set of vacant slots in the presentation skeleton, the steps of:
(c) determining nearest neighbor fitness measures between an extremity sub-image in a slot bordering a set of vacant slots and complementary sub-images of corresponding sub-image sets in the candidate groups not selected in step (a);
(d) assigning the sub-image set having the best fitness measure to a vacant slot adjacent to said slot having the extremity sub-image; and
(e) repeating steps (c) and (d) until the set of vacant slots is filled.

4. A method according to claim 1, wherein prior to the inserting step, the method further comprises the steps of:
(a) associating a number of the candidate groups with corresponding ones of said key slots;
(b) choosing, from each said associated candidate group, one sub-image set for insertion into a corresponding key slot; and wherein the placing step comprises:
(c) assigning, from each of at least some of the non-associated candidate groups, a sub-image set to each said non-key slot, to thereby form a candidate presentation;
(d) repeating steps (b) and (c) to thereby form a population of candidate presentations;
(e) determining a fitness measure of each candidate presentation in the population according to a presentation fitness function;
(f) if a stop condition is met defining the candidate presentation having the best fitness measure to be the presentation; and
(g) if the stop condition is not met, (i) applying a genetic optimization process to the population to thereby build a new population of candidate presentations, and (ii) repeating steps (e) to (g) in respect of the new population.

5. A method according to claim 3, after step (e), the method further comprises the step of:
(f) applying at least one of cross fade, fade-to-black, and fade-to-white transitions between extremity sub-images at the boundaries of the previously vacant slots.

6. A method according to claim 3, wherein the nearest neighbor fitness measures in step (c) are dependent upon at least one of:
an amount and distribution of pan effects in the extremity sub-image and said complementary sub-images;
an amount and distribution of tilt effects in the extremity sub-image and said complementary sub-images;
an amount and distribution of zoom-in effects in the extremity sub-image and said complementary sub-images; and
an amount and distribution of zoom-out effects in the extremity sub-image and said complementary sub-images.

7. A method according to claim 4, wherein each of the sub-image sets in steps (b) and (c) is derived from a different one of said source images.

8. A method according to claim 4, wherein the fitness measure of said candidate presentation in step (e) is dependent upon SIP fitness, as determined in accordance with an SIP fitness function, of corresponding sub-image sets in said candidate presentation.

9. A method according to claim 4, wherein the step of applying a genetic optimization process comprises the steps of:
selecting a pair of parent presentations from the population based on their respective presentation fitness according to the presentation fitness function;
combining the selected pair of parent presentations to thereby produce a child presentation, said child presentation being a member of the new population; and
repeating the selecting and combining steps until the new population is the same size as the population.

10. A method according to claim 9, wherein the combining step comprises applying at least one of a crossover process having an associated crossover probability, and a mutation process having an associated mutation probability, to said selected pair of parent presentations.

11. A method according to claim 10, wherein said crossover process ensures that each sub-image set in the child presentation is derived from a different one of said source images.

12. An apparatus for producing an image presentation from a set of source images, the apparatus comprising:
means for defining a multi-slot presentation skeleton comprising a predetermined number of slots into which images are to be inserted, the number of said slots being dependent upon a predetermined duration of the presentation;
means for establishing durations and locations of key slots and durations and locations of non-key slots in the skeleton;
means for generating candidate groups of sub-image sets from corresponding source images in the set of source images;
means for inserting, into each said key slot, one sub-image set from the candidate groups;
means for placing, into each said non-key slot, one sub-image set from the candidate groups; and
means for processing the sub-image sets in the skeleton slots using effect and transition rules, to thereby form the image presentation to be displayed.

13. An apparatus according to claim 12 wherein the means for generating comprises:
  means for classifying the source images into groups; and
  means for performing, using spatial connection rules, at least one of cropping and sizing of each source image to thereby generate a corresponding sub-image set.

14. An apparatus according to claim 12, further comprising:
  (a) means for selecting a number of candidate groups equal to the number of said key slots;
  (b) means for choosing, from each of the selected candidate groups, a sub-image set for insertion into each corresponding key slot;
  (c) means for determining nearest neighbor fitness measures between the extremity sub-image in a slot bordering a set of vacant slots and complementary sub-images of corresponding sub-image sets in the candidate groups not selected by means (a);
  (d) means for assigning the sub-image set having the best fitness measure to the vacant slot adjacent to said slot having the extremity sub-image; and
  (e) means for repeating actuation of means (c) and (d) until the set of vacant slots is filled.

15. An apparatus according to claim 12, further comprising:
  (a) means for associating a number of the candidate groups with corresponding ones of said key slots;
  (b) means for choosing, from each said associated candidate group, one sub-image set for insertion into a corresponding key slot;
  (c) means for assigning, from each of at least some of the non-associated candidate groups, a sub-image set to each said non-key slot, to thereby form a candidate presentation;
  (d) means for repetitively activating means (b) and (c) to thereby form a population of candidate presentations;
  (e) means for determining a fitness measure of each candidate presentation in the population according to a presentation fitness function;
  (f) means for defining, if a stop condition is met, the candidate presentation having the best fitness measure to be the presentation; and
  (g) means, if the stop condition is not met, for (i) applying a genetic optimization process to the population to thereby build a new population of candidate presentations, and (ii) repeating actuation of means (e) to (g) in respect of the new population.

16. A computer program stored on a computer readable medium for directing a processor to execute a procedure for producing an image presentation from a set of source images, said program comprising:
  code for defining a multi-slot presentation skeleton comprising a predetermined number of slots into which images are to be inserted, the number of said skeleton slots being dependent upon a predetermined duration of the presentation;
  code for establishing durations and locations of key slots and durations and locations of non-key slots in the skeleton;
  code for generating candidate groups of sub-image sets from corresponding source images in the set of source images;
  code for inserting, into each said key slot, one sub-image set from the candidate groups;
  code for placing, into each said non-key slot, one sub-image set from the candidate groups; and
  code for processing the sub-image sets in the skeleton slots using effect and transition rules, to thereby form the image presentation to be displayed.

17. A computer program stored on a computer-readable medium according to claim 16 wherein the code for generating comprises:
  code for classifying the source images into groups; and
  code for performing, using spatial connection rules, at least one of cropping and sizing of each source image to thereby generate a corresponding sub-image set.

18. A computer program stored on a computer-readable medium according to claim 16, further comprising:
  (a) code for selecting a number of candidate groups equal to the number of said key slots;
  (b) code for choosing, from each of the selected candidate groups, a sub-image set for insertion into a corresponding said key slot;
  (c) code for determining nearest neighbor fitness measures between the extremity sub-image in a slot bordering a set of vacant slots and complementary sub-images of corresponding sub-image sets in the candidate groups not selected by code (a);
  (d) code for assigning the sub-image set having the best fitness measure to the vacant slot adjacent to said slot having the extremity sub-image; and
  (e) code for repeating execution of codes (c) and (d) until the set of vacant slots is filled.

19. A computer program stored on a computer readable medium according to claim 16, further comprising:
  (a) code for associating a number of the candidate groups with corresponding ones of said key slots;
  (b) code for choosing, from each said associated candidate group, one sub-image set for insertion into a corresponding key slot;
  (c) code for assigning, from each of at least some of the non-associated candidate groups, a sub-image set to each said non-key slot, to thereby form a candidate presentation;
  (d) code for repetitively activating codes (b) and (c) to thereby form a population of candidate presentations;
  (e) code for determining a fitness measure of each candidate presentation in the population according to a presentation fitness function;
  (f) code for defining, if a stop condition is met, the candidate presentation having the best fitness measure to be the presentation; and
  (g) code, if the stop condition is not met, for (i) applying a genetic optimization process to the population to thereby build a new population of candidate presentations, and (ii) repeating execution of codes (e) to (g) in respect of the new population.

20. A method of composing an image presentation from a set of source images, the method comprising the steps of:
  (i) building a population of candidate presentations each comprising a sequence of sub-image sets derived from corresponding source images in the set of source images;
  (ii) determining a presentation fitness of each said candidate presentation in the population according to a presentation fitness function;
  (iii) if a stop condition is met, identifying the fittest candidate presentation from the population, as determined in accordance with the presentation fitness function, to thereby identify the image presentation to be displayed; and
  (iv) if the stop condition is not met, (a) applying a genetic optimization process to the population to thereby build a new population of candidate presentations, and (b) repeating steps (ii) and (iii) in respect to the new population.

21. A method according to claim 20, wherein each of the sub-image sets is derived from a different one of said source images.

22. A method according to claim 20, wherein the fitness of said candidate presentation is dependent upon SIP fitness, as determined in accordance with an SIP fitness function, of the corresponding sub-image sets in said candidate presentation.

23. A method according to claim 20, wherein the step of applying a genetic optimization process comprises the steps of:
   selecting a pair of parent presentations from the population based on their respective presentation fitness according to the presentation fitness function;
   combining the selected pair of parent presentations to thereby produce a child presentation, said child presentation being a member of the new population; and
   repeating the selecting and combining steps until the new population is the same size as the population.

24. A method according to claim 23, wherein said combining step comprises applying at least one of a crossover process having an associated crossover probability, and a mutation process having an associated mutation probability, to said selected pair of parent presentations.

25. A method according to claim 24, wherein said crossover process ensures that each sub-image set in the child presentation is derived from a different one of said source images.

26. An apparatus for composing an image presentation from a set of source images, the apparatus comprising:
   (i) means for building a population of candidate presentations each comprising a sequence of sub-image sets derived from corresponding source images in the set of source images;
   (ii) means for determining a presentation fitness of each said candidate presentation in the population according to a presentation fitness function;
   (iii) means for identifying, if a stop condition is met, identifying the fittest candidate presentation from the population, according to the presentation fitness function, to thereby identify the image presentation to be displayed; and
   (iv) means, if the stop condition is not met, (a) for applying a genetic optimization process to the population to thereby build a new population of candidate presentations, and (b) for repeating actuation of means (ii) and (iii) in respect to the new population.

27. A computer program product including a computer readable medium having encoded thereon a computer program to instruct a computer to implement a method of composing an image presentation from a set of source images, said program comprising:
   (i) code for building a population of candidate presentations each comprising a sequence of sub-image sets derived from corresponding source images in the set of source images;
   (ii) code for determining a presentation fitness of each said candidate presentation in the population according to a presentation fitness function;
   (iii) code for identifying, if a stop condition is met, identifying the fittest candidate presentation from the population, as determined in accordance with the presentation fitness function, to thereby identify the image presentation to be displayed; and
   (iv) code, if the stop condition is not met, (a) for applying a genetic optimization process to the population to thereby build a new population of candidate presentations, and (b) for repeating execution of codes (ii) and (iii) in respect to the new population.

28. A computer program stored on a computer readable medium for instructing a computer to implement a method of composing an image presentation from a set of source images, said program comprising:
   (i) code for building a population of candidate presentations each comprising a sequence of sub-image sets derived from corresponding source images the set of source images;
   (ii) code for determining a presentation fitness for each said candidate presentation in the population according to a presentation fitness function;
   (iii) code for identifying, if a stop condition is met, the fittest candidate presentation from the population, according to the presentation fitness function, to thereby identify the image presentation; and
   (iv) code, if the stop condition is not met, (a) for applying a genetic optimization process to the population to thereby build a new population of candidate presentations, and (b) for repeating execution of codes (ii) and (iv) in respect of the new population.

29. A method of composing a media presentation for a predetermined presentation style from a set of media sources, the method comprising the steps of:
   (i) building a population of candidate presentations each comprising a sequence of media sets derived from said media sources, each said media set being one of a possible group being generated from a media source and having members which represent key points of an artistic effect in the said candidate presentation, said key points including endpoints of the effect;
   (ii) determining a presentation fitness for each said candidate presentation in the population, said presentation fitness being a measure of how well the said adjacent endpoints of the said adjacent media sets connect for the said predetermined style;
   (iii) if a stop condition is met, identifying the candidate presentation having a best presentation fitness from the population, said identified candidate presentation being the resultant media presentation of the process to be displayed; and
   (iv) if the stop condition is not met, (a) applying a genetic optimization process to the population to thereby build a new population of candidate presentation, and (b) repeating sets (ii) and (iii) in respect of the new population.

30. A method according to claim 29 wherein said media presentation is composed from a set of digital image sources.

31. A method according to claim 29 wherein said media presentation is composed from a set of digital video sources.

32. A method according to claim 29 wherein said media presentation is composed from a set of digital audio sources.

33. A method according to claim 30 wherein said media presentation is composed of a temporally connected combination of media sets.

34. A method according to either one of claim 30 or claim 33 wherein said media sets are generated to have key points which represent the endpoints of a zoom in artistic effect.

35. A method according to either claim 30 or 33 wherein said media sets are generated to have key points which represent the endpoints of a zoom out artistic effect.

36. A method according to either claim 30 or 33 wherein said media sets are generated to have key points which represent the endpoints of a pan artistic effect.

37. A method according to either claim 30 or 33 wherein said media sets are generated to have the key points of an artistic effect which includes some combination of a zoom-in, pan, and zoom-out effect.

38. A method according to either claim 30 or 33 wherein said presentation fitness depends on how well faces in adjacent endpoints of adjacent media sets overlap, said presentation fitness resulting in a low value if no or little overlap is detected.

39. A method according to either claim 30 or 33 wherein said presentation fitness depends on how well color regions in adjacent endpoints of adjacent media sets match, said presentation fitness resulting in a high value if the color regions are substantially similar.

40. A method according to claim 29 wherein the step of applying a genetic optimization process comprises the steps of:
   (i) selecting a pair of parent candidate presentations from the population based on respective presentation fitness of said parent candidate presentations;
   (ii) combining selected pair of parent candidate presentations to thereby produce at least one child candidate presentation, said child candidate presentation being a member of the new population; and
   (iii) repeating said selecting and combining steps until the new population is the same size as the original population.

41. A method according to claim 40 wherein said combining step comprises applying at least one crossover process, said crossover process having an associated crossover probability.

42. A method according to claim 40 wherein said combining step comprises applying at least one mutation process, said mutation process having an associated mutation probability.

43. A method according to claim 41 wherein said crossover process ensures that each media source is represented only once in the child presentation.

44. A method according to claim 42 wherein said mutation process ensures that each media source is represented only once in the child presentation.

* * * * *

UNITED STATES PATENT AND TRADEMARK OFFICE
CERTIFICATE OF CORRECTION

| | |
|---|---|
| PATENT NO. | : 7,216,295 B2 |
| APPLICATION NO. | : 10/323938 |
| DATED | : May 8, 2007 |
| INVENTOR(S) | : Jing Wu et al. |

It is certified that error appears in the above-identified patent and that said Letters Patent is hereby corrected as shown below:

ON THE TITLE PAGE
    At Item (56), Foreign Patent Documents, "00/62190" should read -- WO 00/62190--; and "00/73914" should read --WO 00/73914--.

COLUMN 3
    Line 11, "(iv) in respect of" should read --(iii) in respect to--;
    Line 28, "(iv) in respect of" should read --(iii) in respect to--;
    Line 49, "(iv) in respect of" should read --(iii) in respect to--.

COLUMN 4
    Line 2, "(iv) in respect of" should read --(iii) in respect to--.

COLUMN 5
    Line 45, "zoom out,: should read --zoom-out,--;
    Line 46, "zoom in,: should read --zoom-in,--.

COLUMN 6
    Line 47, "IBM-PC's" should read --IBM-PCs--.

COLUMN 12
    Line 62, "742,744" should read --742, ..., 744--.

COLUMN 14
    Line 7, "an" should read --a--;
    Line 14, "an" should read --a--.

COLUMN 15
    Line 32, "applies" should read --applies to--.

COLUMN 19
    Line 23, "of" should read --to--.

COLUMN 28
    Line 52, "extract" should read --extracted--.

UNITED STATES PATENT AND TRADEMARK OFFICE
CERTIFICATE OF CORRECTION

PATENT NO. : 7,216,295 B2
APPLICATION NO. : 10/323938
DATED : May 8, 2007
INVENTOR(S) : Jing Wu et al.

It is certified that error appears in the above-identified patent and that said Letters Patent is hereby corrected as shown below:

COLUMN 65
　　Line 19, "claim 1" should read --claim 1,--.

COLUMN 66
　　Line 1, "claim 3," should read --claim 3, wherein--.

COLUMN 67
　　Line 1, "claim 12" should read --claim 12,--;
　　Line 48, "computer readable" should read --computer-readable--.

COLUMN 68
　　Line 5, "claim 16" should read --claim 16,--;
　　Line 28, "computer readable" should read --computer-readable--;
　　Line 51, "of" should read --to--.

COLUMN 69
　　Line 42, "identifying" should be deleted.
　　Line 51, "computer" should read --computer- --;
　　Line 64, "identifying" should be deleted;
　　Line 65, "as determined in accordance with" should read --according to--.

COLUMN 70
　　Line 6, "computer readable" should read --computer-readable--;
　　Line 12, "images" should read --images in--;
　　Line 20, "presentation;" should read --presentation to be displayed;--;
　　Line 25, "(iv)" should read --(iii)--; and "of" should read --to--;
　　Line 49, "presentation," should read --presentations,--;
　　Line 50, "sets" should read --steps--; and "of" should read --to--;
　　Line 52, "claim 29" should read --claim 29,--;
　　Line 54, "claim 29" should read --claim 29,--;
　　Line 56, "claim 29" should read --claim 29,--;
　　Line 58, "claim 30" should read --claim 30,--;
　　Line 62, "33" should read --33,--;
　　Line 64, "zoom in" should read --zoom-in--;
　　Line 65, "claim 30 or 33" should read --claim 30 or 33,--;
　　Line 67, "zoom out" should read --zoom-out--.

UNITED STATES PATENT AND TRADEMARK OFFICE
CERTIFICATE OF CORRECTION

PATENT NO. : 7,216,295 B2
APPLICATION NO. : 10/323938
DATED : May 8, 2007
INVENTOR(S) : Jing Wu et al.

It is certified that error appears in the above-identified patent and that said Letters Patent is hereby corrected as shown below:

COLUMN 71
        Line 1, "claim 30 or 33" should read --claim 30 or 33,--;
        Line 4, "claim 30 or 33" should read --claim 30 or 33,--;
        Line 8, "claim 30 or 33" should read --claim 30 or 33,--;
        Line 13, "claim 30 or 33" should read --claim 30 or 33,--;
        Line 18, "claim 29" should read --claim 29,--.

COLUMN 72
        Line 8, "claim 40" should read --claim 40,--;
        Line 12, "claim 40" should read --claim 40,--;
        Line 16, "claim 41" should read --claim 41,--;
        Line 19, "claim 42" should read --claim 42,--.

Signed and Sealed this

Third Day of June, 2008

JON W. DUDAS
*Director of the United States Patent and Trademark Office*